United States Patent
Mochizuki et al.

(10) Patent No.: US 10,219,127 B2
(45) Date of Patent: Feb. 26, 2019

(54) INFORMATION PROCESSING APPARATUS AND INFORMATION PROCESSING METHOD

(71) Applicant: SONY CORPORATION, Tokyo (JP)

(72) Inventors: Daisuke Mochizuki, Chiba (JP); Shosuke Momotani, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/574,449

(22) PCT Filed: Feb. 24, 2016

(86) PCT No.: PCT/JP2016/055417
§ 371 (c)(1),
(2) Date: Nov. 15, 2017

(87) PCT Pub. No.: WO2016/189909
PCT Pub. Date: Dec. 1, 2016

(65) Prior Publication Data
US 2018/0139592 A1    May 17, 2018

(30) Foreign Application Priority Data

May 28, 2015  (JP) ................................. 2015-108802

(51) Int. Cl.
*H04W 4/21* (2018.01)
*H04W 4/02* (2018.01)
(Continued)

(52) U.S. Cl.
CPC ............. *H04W 4/21* (2018.02); *H04W 4/023* (2013.01); *H04W 4/027* (2013.01); *H04W 8/00* (2013.01);
(Continued)

(58) Field of Classification Search
CPC ......... H04L 12/66; H04L 67/18; H04L 67/22; H04L 67/306; H04W 8/22; H04W 8/005;
(Continued)

(56) References Cited

U.S. PATENT DOCUMENTS

2011/0177802 A1    7/2011  Gupta
2013/0325392 A1*  12/2013  Takahashi ......... H04M 1/72563
                                                        702/141
2014/0187324 A1    7/2014  Masuda

FOREIGN PATENT DOCUMENTS

CN    102714667 A    10/2012
EP    2526677 A1    11/2012
(Continued)

OTHER PUBLICATIONS

International Search Report and Written Opinion of PCT Application No. PCT/JP2016/055417, dated May 10, 2016, 08 pages of ISRWO.

*Primary Examiner* — Nizar N Sivji
(74) *Attorney, Agent, or Firm* — Chip Law Group

(57) ABSTRACT

An information processing apparatus includes: a recognizing unit configured to recognize a terminal which is a transmission source of a signal on the basis of a detection result of the signal for radiRs111o communication for allowing terminals to perform direct communication with each other via a radio transmission path; a recording unit configured to record history information including a recognition result of the terminal and information for determining whether or not the terminal detected by a predetermined detecting unit is held by a user, for each first period; a determining unit configured to determine whether or not the terminal is held by the user on the basis of the history information recorded during a second period which is longer than the first period; and a processing unit configured to
(Continued)

execute predetermined processing on the basis of the recognition result of the terminal and the determination result.

19 Claims, 15 Drawing Sheets

(51) Int. Cl.
　　　*H04W 92/18*　　(2009.01)
　　　*H04W 8/00*　　(2009.01)
　　　*H04W 8/18*　　(2009.01)
　　　*H04W 76/14*　　(2018.01)
　　　*H04W 8/20*　　(2009.01)

(52) U.S. Cl.
　　　CPC ............. *H04W 8/005* (2013.01); *H04W 8/18* (2013.01); *H04W 8/205* (2013.01); *H04W 76/14* (2018.02); *H04W 92/18* (2013.01)

(58) Field of Classification Search
　　　CPC ..... H04W 76/10; H04W 88/06; H04W 84/18; H04W 4/21; H04W 76/14; H04W 4/023; H04W 4/027; H04W 8/00; H04M 1/72569

See application file for complete search history.

(56) References Cited

FOREIGN PATENT DOCUMENTS

| | | |
|---|---|---|
| EP | 2749330 A1 | 7/2014 |
| JP | 2013-517744 A | 8/2014 |
| JP | 2014-143664 A | 8/2014 |
| KR | 10-2012-0120313 A | 11/2012 |

* cited by examiner

|  | THERE IS NO FLUCTUATION IN OBSERVATION CONDITION OF TARGET DEVICE | THERE IS FLUCTUATION IN OBSERVATION CONDITION OF TARGET DEVICE |
|---|---|---|
| OWN DEVICE REMAINS STATIONARY | TARGET DEVICE IS DEVICE WHICH DOES NOT MOVE | TARGET DEVICE IS DEVICE WHICH MOVES |
| OWN DEVICE IS MOVING | TARGET DEVICE IS DEVICE WHICH MOVES | MOVEMENT OF TARGET DEVICE IS UNCLEAR |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2016/055417 filed on Feb. 24, 2016, which claims priority benefit of Japanese Patent Application No. JP 2015-108802 filed in the Japan Patent Office on May 28, 2015. Each of the above-referenced applications is hereby incorporated herein by reference in its entirety.

TECHNICAL FIELD

The present disclosure relates to an information processing apparatus, an information processing method, and a program.

BACKGROUND ART

In accordance with development of a communication technology and reduction in size of various kinds of devices, types of equipment which is called a so-called information processing apparatus become diversified, and equipment such as a smartphone and a tablet terminal, which is configured to be able to be carried by a user, as well as a personal computer (PC), or the like, becomes widespread. Further, in recent years, a so-called wearable terminal has been proposed which is configured to be able to be used while being carried by the user by being worn on part of the body.

In this manner, in accordance with spread of an information processing apparatus which is configured to be able to be carried by the user, service which utilizes the information processing apparatus has also been studied. For example, Patent Literature 1 discloses an example of a technology of enabling recognition of other users who share the same place by a terminal held by the user communicating with other terminals existing within a predetermined range.

CITATION LIST

Patent Literature

Patent Literature 1: WO 2007/105436

DISCLOSURE OF INVENTION

Technical Problem

Meanwhile, because it is assumed in the technology disclosed in Patent Literature 1 that a terminal held by each user can perform communication with terminals held by other users, it is necessary to perform pre-procedure such as setting for performing the communication and registration to predetermined service. Under such circumstances, a case can be assumed where users who can be recognized as users who share the same place are limited to users for whom the pre-procedure has been performed. Therefore, it is desired to recognize users in a wider range as users who share the place without performing troublesome procedure such as pre-procedure.

Therefore, the present disclosure proposes an information processing apparatus, an information processing method and a program which enable recognition of user who shares a place without troublesome procedure being performed.

Solution to Problem

According to the present disclosure, there is provided an information processing apparatus including: a recognizing unit configured to recognize a terminal which is a transmission source of a signal on the basis of a detection result of the signal for radio communication for allowing terminals to perform direct communication with each other via a radio transmission path; a recording unit configured to record history information including a recognition result of the terminal and information for determining whether or not the terminal detected by a predetermined detecting unit is held by a user, for each first period; a determining unit configured to determine whether or not the terminal is held by the user on the basis of the history information recorded during a second period which is longer than the first period; and a processing unit configured to execute predetermined processing on the basis of the recognition result of the terminal and the determination result.

In addition, according to the present disclosure, there is provided an information processing method to be performed by a processor, the information processing method including: recognizing a terminal which is a transmission source of a signal on the basis of a detection result of the signal for radio communication for allowing terminals to perform direct communication with each other via a radio transmission path; recording history information including a recognition result of the terminal and information for determining whether or not the terminal detected by a predetermined detecting unit is held by a user, for each first period; determining whether or not the terminal is held by the user on the basis of the history information recorded during a second period which is longer than the first period; and executing predetermined processing on the basis of the recognition result of the terminal and the determination result.

In addition, according to the present disclosure, there is provided a program causing a computer to execute: recognizing a terminal which is a transmission source of a signal on the basis of a detection result of the signal for radio communication for allowing terminals to perform direct communication with each other via a radio transmission path; recording history information including a recognition result of the terminal and information for determining whether or not the terminal detected by a predetermined detecting unit is held by a user, for each first period; determining whether or not the terminal is held by the user on the basis of the history information recorded during a second period which is longer than the first period; and executing predetermined processing on the basis of the recognition result of the terminal and the determination result.

Advantageous Effects of Invention

As described above, according to the present disclosure, there are provided an information processing apparatus, an information processing method, and a program which enable recognition of a user who shares a place without troublesome procedure being performed.

Note that the effects described above are not necessarily limitative. With or in the place of the above effects, there

MODES FOR CARRYING OUT THE INVENTION

Figure 1:
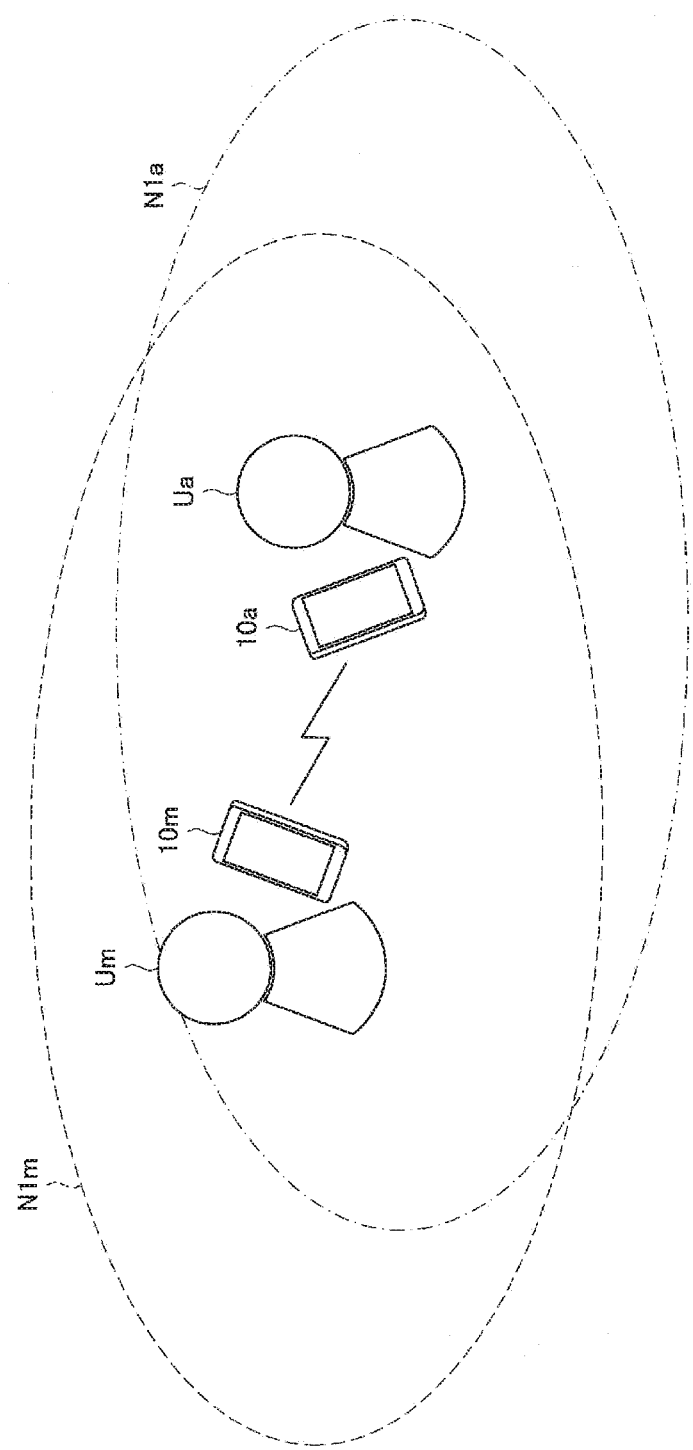
FIG. 1 is an explanatory diagram for explaining an example of a schematic system configuration of a system to which an information processing apparatus according to an embodiment of the present disclosure is applied.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. System configuration
2. Functional configuration
3. Creation or updating of real graph
4. Example of operation based on real graph
5. Modified examples
5.1. Modified example 1: determination method utilizing machine learning
5.2. Modified example 2: example of information sharing via server
5.3. Modified example 3: modified example of real graph
6. Hardware configuration
7. Conclusion

1. SYSTEM CONFIGURATION

First, an example of a schematic system configuration of a system to which an information processing apparatus according to an embodiment of the present disclosure is applied will be described with reference to FIG. 1. FIG. 1 is an explanatory diagram for explaining an example of the schematic system configuration of the system to which the information processing apparatus according to the present embodiment is applied.

In FIG. 1, information processing apparatuses 10*m* and 10*a* are, for example, equipment configured to be able to be carried by a user, such as a smartphone, a tablet terminal, and a wearable terminal. For example, the information processing apparatus 10*m* indicates an example of equipment (that is, equipment being carried) held by a user Um. In a similar manner, the information processing apparatus 10*a* indicates an example of equipment held by a user Ua. Note that, in the following description, in the case where information processing apparatuses held by respective users are not particularly distinguished as the information processing apparatuses 10*m* and 10*a*, there is a case where the information processing apparatuses are simply referred to as an "information processing apparatus 10".

The information processing apparatus 10 is configured to be able to detect signals for radio communication for allowing a plurality of terminals to perform direct communication with each other via a radio transmission path. Examples of the radio communication can include, for example, radio communication based on standards such as Bluetooth (registered trademark), Bluetooth low energy (BLE), and wireless fidelity (Wi-Fi) (registered trademark). Further, examples of a radio communication technology utilizing BLE can include, for example, iBeacon (registered trademark). Note that, in the following description, simple description of "radio communication" indicates radio communication in which a plurality of terminals perform direct communication with each other via a radio transmission path described above.

In FIG. 1, a reference symbol N1*m* indicates a communication range of radio communication of the information processing apparatus 10*m*. In a similar manner, a reference symbol N1*a* indicates a communication range of radio communication of the information processing apparatus 10*a*.

For example, in the example illustrated in FIG. 1, the information processing apparatus 10*a* transmits (for example, broadcasts) signals for radio communication to other terminals (for example, many and unspecified other information processing apparatuses 10) located within the communication range N1a. If the information processing apparatus 10m enters the communication range N1a under such circumstances, the information processing apparatus 10m detects a signal for radio communication transmitted from the information processing apparatus 10a. In this event, the information processing apparatus 10m extracts information relating to the information processing apparatus 10a from a radio signal from the detected information processing apparatus 10a and recognizes the information processing apparatus 10a on the basis of the extracted information.

In a similar manner, in the case where the information processing apparatus 10a enters the communication range N1m, the information processing apparatus 10a may recognize the information processing apparatus 10m by detecting a signal for radio communication transmitted from the information processing apparatus 10m and extracting information relating to the information processing apparatus 10m from the detected signal.

Then, the information processing apparatus 10m records a recognition result of the information processing apparatus 10a as data, so that the information processing apparatus 10m can recognize that the user Um of the information processing apparatus 10m and the user Ua of the information processing apparatus 10a share the same place by utilizing the data recorded in the past.

Therefore, in the following description, an example of a mechanism for enabling the information processing apparatus 10m to recognize that the user Um of the information processing apparatus 10m and the user Ua of the information processing apparatus 10a share the same place will be described in detail with an example of a configuration of the information processing apparatus 10.

2. FUNCTIONAL CONFIGURATION

Figure 2:
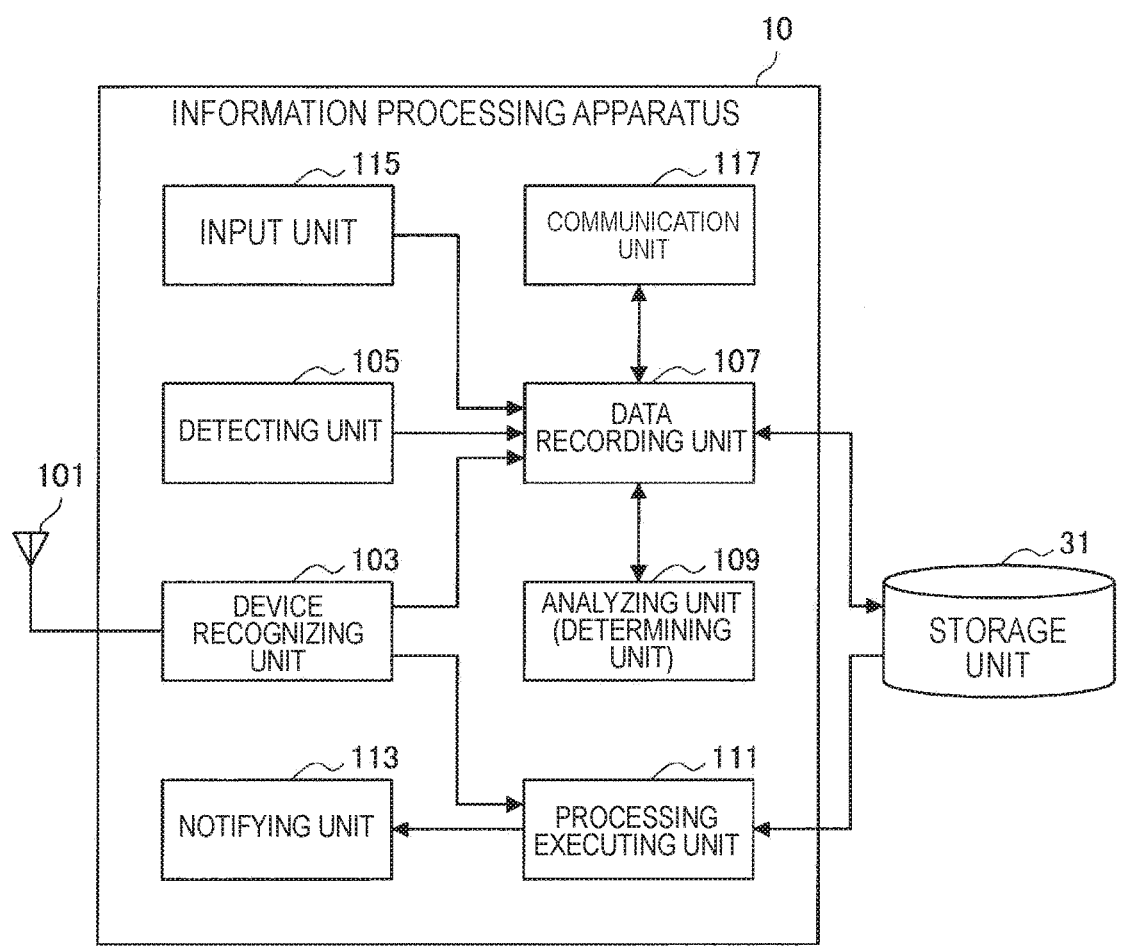
FIG. 2 is a block diagram illustrating an example of a functional configuration of the information processing apparatus according to the embodiment.

An example of a functional configuration of the information processing apparatus 10 according to the present embodiment will be described with reference to FIG. 2. FIG. 2 is a block diagram illustrating an example of the functional configuration of the information processing apparatus 10 according to the present embodiment. Note that, in the present description, to make characteristics of the information processing apparatus 10 according to the present embodiment more easily understood, description will be provided using an example where the information processing apparatus 10m recognizes the information processing apparatus 10a held by the user Ua while the information processing apparatus 10a is referred to as an external device.

As illustrated in FIG. 2, the information processing apparatus 10 includes a radio signal detecting unit 101, a device recognizing unit 103, a detecting unit 105, a data recording unit 107, an analyzing unit 109, a processing executing unit 111, a notifying unit 113, an input unit 115 and a storage unit 31. Further, the information processing apparatus 10 may include a communication unit 117.

The communication unit 117 is a component for allowing each component within the information processing apparatus 10 to establish communication with an external apparatus (such as, for example, a server) via a network and transmit/receive various kinds of information (various kinds of data) to/from the external apparatus. Note that, in the following description, in the case where each component within the information processing apparatus 10 transmits/receives information to/from an external apparatus via a network, even if there is no particular description, information is transmitted/received via the communication unit 117.

The radio signal detecting unit 101 is, for example, configured to be able to detect a signal for radio communication, like an antenna for radio communication. For example, when the radio signal detecting unit 101 detects a radio signal transmitted from an external device, the radio signal detecting unit 101 outputs a detection result of the radio signal to a device recognizing unit 103.

The device recognizing unit 103 acquires the detection result of the radio signal from the radio signal detecting unit 101 and recognizes an external device which is a transmission source of the radio signal on the basis of information included in the radio signal. As a specific example, the device recognizing unit 103 includes a radio frequency (RF) circuit, a baseband processor, or the like, and demodulates the radio signal detected by the radio signal detecting unit 101. The device recognizing unit 103 then recognizes the external device by extracting information relating to the external device (for example, identification information of the external device) from a demodulation result of the radio signal. Note that, in this event, the device recognizing unit 103 may recognize a plurality of external devices for which radio signals are detected.

Further, the device recognizing unit 103 may acquire information indicating signal strength of the radio signal as information indicating a recognition result of the external device which is a transmission source of the radio signal on the basis of the detection result of the radio signal.

The device recognizing unit 103 then outputs information indicating recognition results of one or more external devices for which radio signals are detected to the data recording unit 107 which will be described later. Further, the device recognizing unit 103 may output the information indicating the recognition results of the external devices to the processing executing unit 111 which will be described later.

The detecting unit 105 acquires information relating to a circumstance where the external device is recognized (or information for recognizing the circumstance).

For example, the detecting unit 105 may include a device such as a global positioning system (GPS), and may acquire position information of the information processing apparatus 10 (position information of a user who holds the information processing apparatus 10) by the device.

Further, the detecting unit 105 may acquire various kinds of information of an external environment of the user (in other words, an external environment of the information processing apparatus 10). As a specific example, the detecting unit 105 may include an imaging device such as a camera and may acquire an image of an external environment of the information processing apparatus 10 (that is, an image around the user) imaged by the imaging device. Further, as another example, the detecting unit 105 may include a sound collection device such as a microphone and may acquire audio (for example, sound and environmental sound) of the external environment of the information processing apparatus 10 collected by the sound collection device.

Further, the detecting unit 105 may acquire various kinds of information indicating a state of the information processing apparatus 10 or a state of a user of the information processing apparatus 10. As a specific example, the detecting unit 105 may include a detection device such as an acceleration sensor and an angular velocity sensor and may acquire information indicating a position or orientation of the information processing apparatus 10 detected by the detection device.

Further, as another example, the detecting unit 105 may acquire information indicating change of a position or orientation of at least one portion of the body of the user of the information processing apparatus 10. In this case, for example, the detecting unit 105 only has to acquire information indicating change of a position or orientation of the portion detected by a wearable device which is worn on the portion of the user.

Note that the above-described example is merely an example, and if the detecting unit 105 can acquire information relating to a circumstance when an external device is recognized, types of the information, methods for acquiring the information and a configuration (device) for acquiring the information are not particularly limited.

Further, a timing at which the detecting unit 105 acquires information indicating various kinds of circumstances described above is not particularly limited. For example, the detecting unit 105 may monitor the above-described various kinds of circumstances at each predetermined timing and may acquire information relating to the circumstances. Further, as another example, the detecting unit 105 may acquire information relating to the above-described various kinds of circumstances by being triggered by predetermined action. For example, the detecting unit 105 may acquire information relating to the above-described various kinds of circumstances by being triggered by recognition of an external device by the above-described device recognizing unit 103. Further, as another example, in the case where the detecting unit 105 detects change of the above-described various kinds of circumstances, the detecting unit 105 may acquire information relating to the above-described circumstances after change by being triggered by detection of the change.

As described above, the detecting unit 105 acquires information relating to a circumstance when an external device is recognized and outputs the acquired information to the data recording unit 107.

The data recording unit 107 acquires information indicating a recognition result of one or more external devices from the device recognizing unit 103. Further, the data recording unit 107 acquires information relating to a circumstance when the external device is recognized from the detecting unit 105. The data recording unit 107 stores information indicating the recognition result of the external device and information relating to the above-described circumstance in association with time information (for example, date and time) when the external device is recognized, as low level data. Note that the data recording unit 107 only has to acquire the above-described time information from, for example, a predetermined timer unit (illustration is omitted). Further, the storage unit 31 is a storage region in which various kinds of data to be used by the information processing apparatus 10 to execute various kinds of processing is temporarily or permanently stored.

The data recording unit 107 generates or updates data indicating relationship between the information processing apparatus 10 and each recognized external device on the basis of the low level data accumulated in the storage unit 31 in chronological order. Note that, in the following description, there is a case where the data will be referred to as a "real graph".

Figure 3:
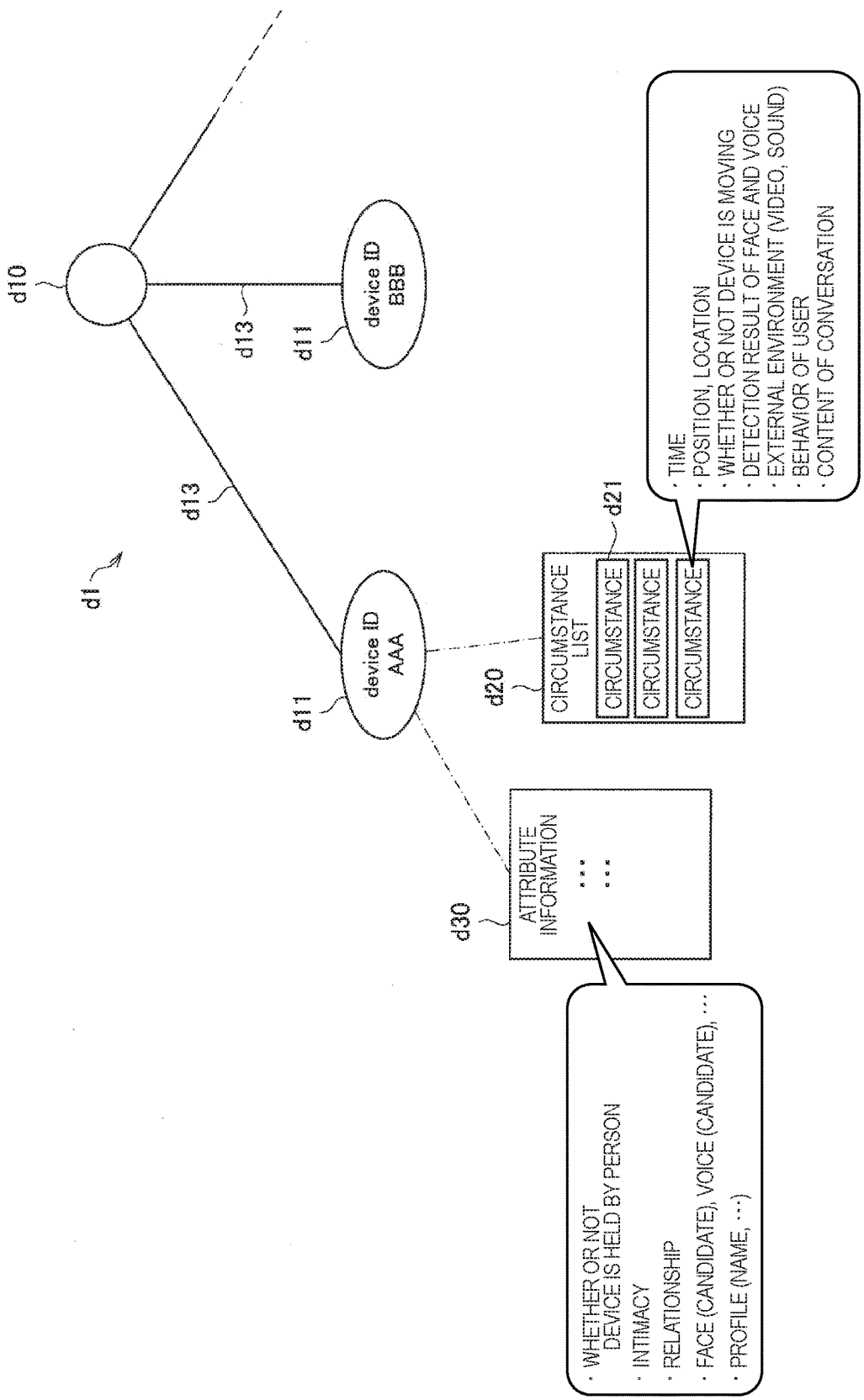
FIG. 3 is an explanatory diagram for explaining an example of a real graph.
Figure 4:
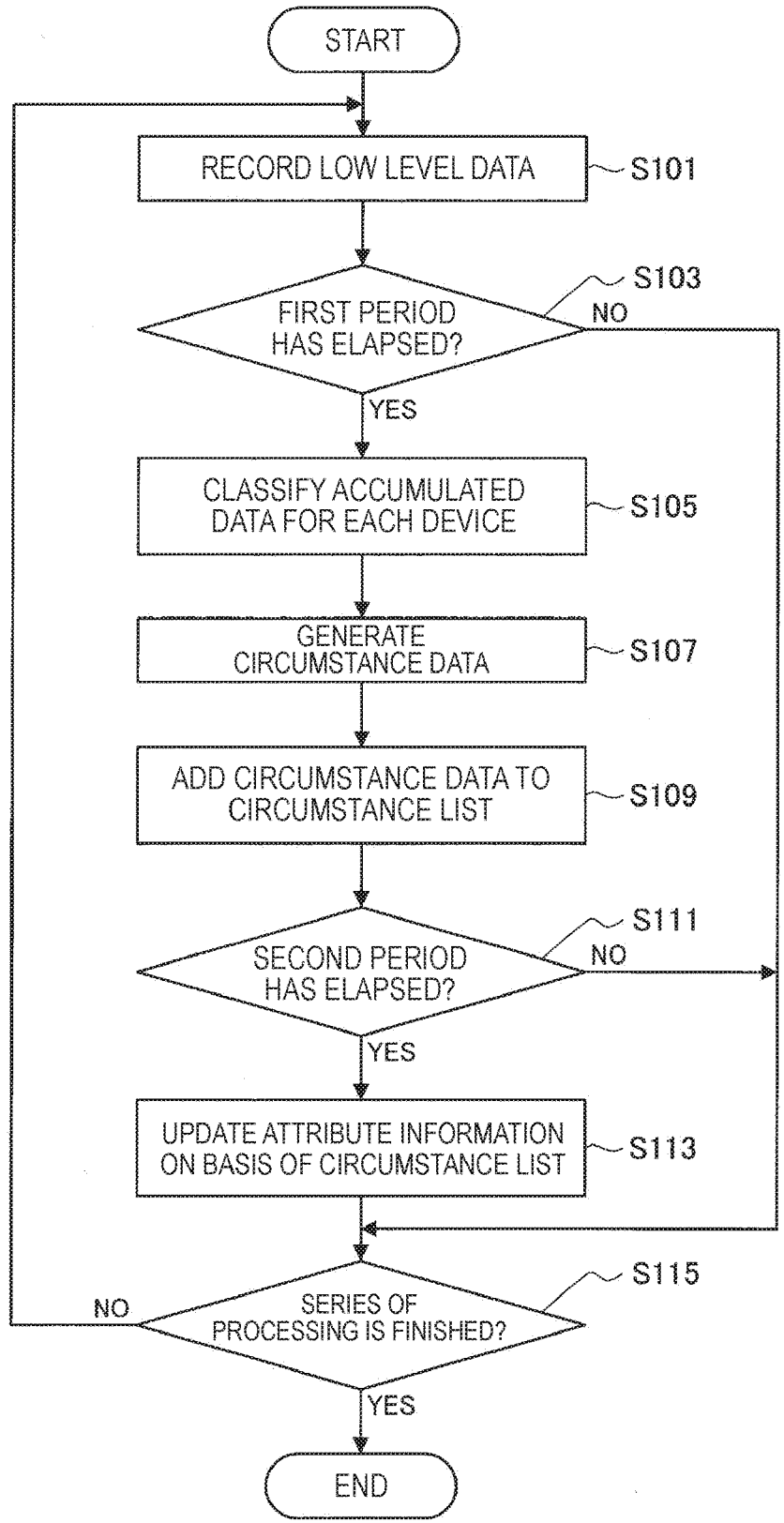
FIG. 4 is an explanatory diagram for explaining an example of operation relating to generation or updating of the real graph by the information processing apparatus according to the embodiment.

For example, FIG. 3 is an explanatory diagram for explaining an example of the real graph. In a real graph dl illustrated in FIG. 3, a node d11 indicating each recognized external device is associated with a node d10 indicating the information processing apparatus 10 with a link d13. Further, a circumstance list d20 and attribute information d30 are associated with the node d11 corresponding to each external device.

In the circumstance list d20, circumstance data d21 indicating a circumstance when the external device indicated by the node d11 is recognized is recorded as a list for each timing at which the external device is recognized. Note that information included in the circumstance data d21 may include information recorded as the low level data like information such as, for example, time at which the external device is recognized, a position (or a location) where the external device is recognized, whether or not the external device is working, an external environment when the external device is recognized, or the like. Further, in the circumstance data d21, as information acquired by analyzing the low level data, for example, information such as a detection result of the faces and voice of other users, behavior of a user of the external device, and content of conversation with the user may be included. Note that the circumstance data d21 can correspond to an example of "history information", and information indicating various kinds of circumstances included in the history information can correspond to "first information".

The attribute information d30 indicates information relating to the external device indicated by the node d11 or a user of the external device. Information relating to the external device recorded as the attribute information d30 may include, for example, information indicating whether or not a person holds the external device. Further, information relating to the user of the external device may include data indicating a candidate of the face or voice of the user detected when the external device is recognized, profile of the user such as name, relationship or intimacy between the user of the information processing apparatus 10 and the user of the external device, or the like. Note that the attribute information d30 can correspond to an example of "second information".

Note that the data recording unit 107 may cause the analyzing unit 109 to acquire or estimate at least part of information among various kinds of information recorded as the circumstance data d21 or the attribute information d30, on the basis of various kinds of information acquired as the low level data or the circumstance data d21.

Further, the data recording unit 107 may update at least part of information among various kinds of information recorded as the attribute information d30, on the basis of an instruction from the user via the input unit 115.

Further, the data recording unit 107 may acquire at least part of information among various kinds of information recorded as the attribute information d30 from an external apparatus such as a server and may update the attribute information d30 of the corresponding external device on the basis of the acquired information. Further, the data recording unit 107 may upload at least part of information among the attribute information d30 acquired for each external device to an external apparatus such as a server. Further, the data recording unit 107 may upload the generated or updated real graph dl itself to an external apparatus such as a server. Note that the present operation will be described in detail later as a modified example.

The data recording unit 107 then stores the generated or updated real graph dl in the storage unit 31. Note that more detailed description of the operation of the data recording unit 107 and the analyzing unit 109 (particularly, processing relating to generation or updating of the real graph dl) will be separately described later along with a specific example of a method for acquiring various kinds of information recorded in the real graph dl.

The input unit 115 is an input interface to be used by the user to input various kinds of information to the information processing apparatus 10. The input unit 115 may include, for example, an input device to be used by the user to input information, such as a button, a switch and a touch panel. Further, the input unit 115 may include a sound collection device such as a so-called microphone, which collects speech uttered by the user as acoustic information.

The notifying unit 113 is an output interface to be used by the information processing apparatus 10 to present various kinds of information to the user. The notifying unit 113 may include, for example, a device such as a so-called display, which outputs image information such as a still image and a moving image. Further, the notifying unit 113 may include, for example, an acoustic device such as a speaker which outputs acoustic information.

The processing executing unit 111 is a component for executing various kinds of functions (for example, application) provided by the information processing apparatus 10. Particularly, the processing executing unit 111 according to the present disclosure may execute predetermined processing on the basis of the attribute information d30 of the external device recorded in the past.

For example, the processing executing unit 111 may cause the notifying unit 113 to give a notification of predetermined information in the case where, when an external device is recognized, the attribute information d30 for the external device has already been acquired (that is, in the case where the external device has been recognized in the past). By this means, the user of the information processing apparatus 10 can recognize that the user has shared the place with the user of the recognized external device in the past. Note that details of the operation of the processing executing unit 111 will be separately described along with a specific example of processing based on the real graph.

An example of the functional configuration of the information processing apparatus 10 according to the present embodiment has been described above with reference to FIG. 2 and FIG. 3. Note that the above-described example is merely an example, and, if the above-described each function of the information processing apparatus 10 can be implemented, the functional configuration of the information processing apparatus 10 is not always limited to the example illustrated in FIG. 2. As a specific example, among components of the information processing apparatus 10, at least part of the components may be provided at an external apparatus such as a server and other apparatuses which operate in cooperation with the information processing apparatus 10.

3. CREATION OR UPDATING OF REAL GRAPH

Among operation of the information processing apparatus 10 according to the present embodiment, details of operation relating to generation or updating of the real graph will be described next with reference to FIG. 4 to FIG. 7 along with an example of flow of a series of processing. FIG. 4 to FIG. 7 are explanatory diagrams for explaining an example of operation relating to generation or updating of the real graph by the information processing apparatus 10 according to the present embodiment. Note that, in the present description, description will be provided along the flowchart illustrated in FIG. 4.

(Step S101: Recording of Low Level Data)

Figure 5:
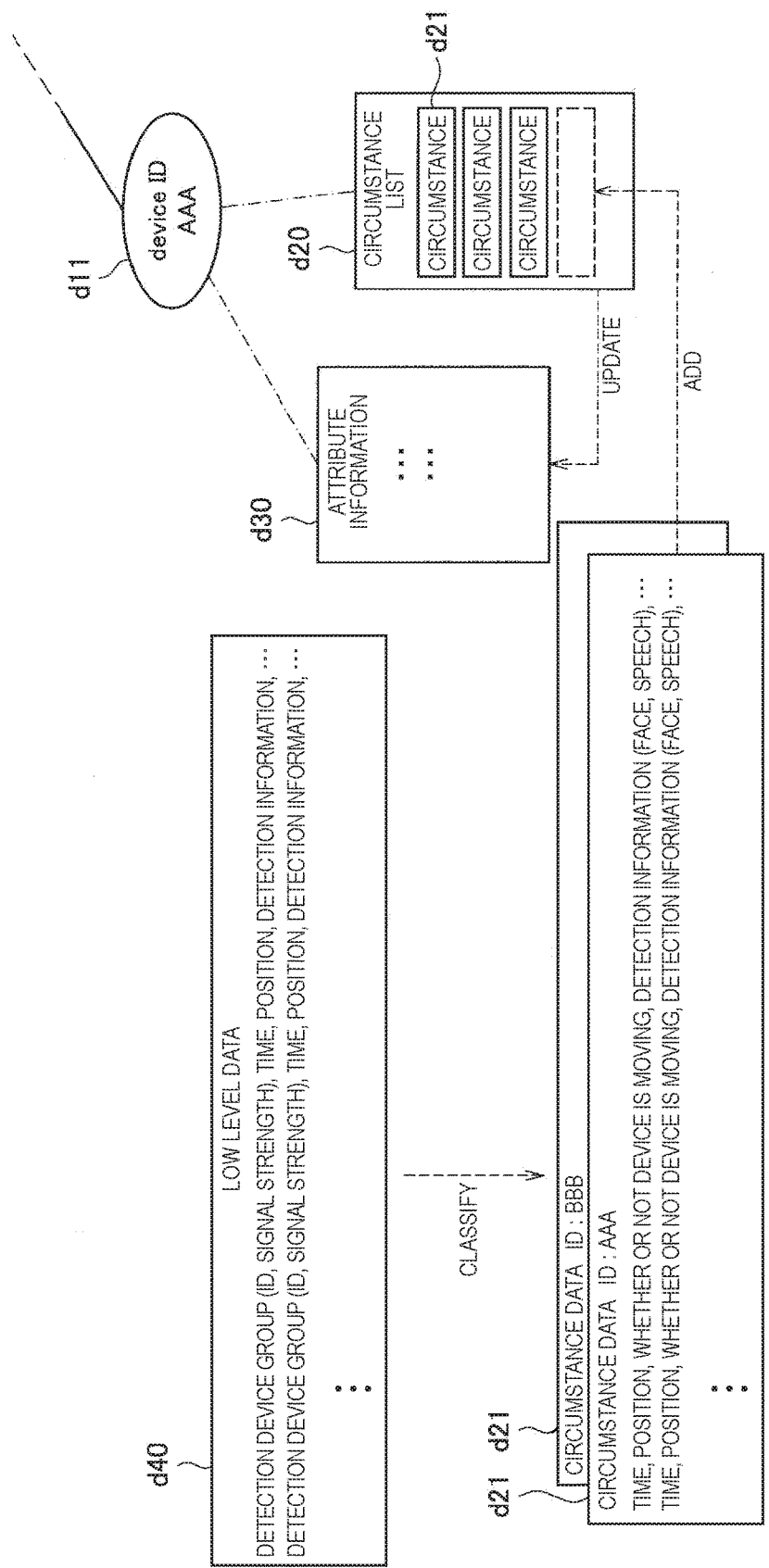
FIG. 5 is an explanatory diagram for explaining an example of operation relating to generation or updating of the real graph by the information processing apparatus according to the embodiment.

First, as mentioned above, the data recording unit 107 records the information indicating the recognition result of one or more external devices by the device recognizing unit 103 and the information relating to the circumstance detected by the detecting unit 105 in the storage unit 31 as the low level data d40 in association with time information when the external device is recognized. By this means, as illustrated in FIG. 5, the low level data d40 is accumulated in the storage unit 31 in chronological order.

(Step S105: Classification of Accumulated Data for Each Device)

When a predetermined first period has elapsed (S103: Yes), the data recording unit 107 extracts the low level data d40 accumulated during the first period from the storage unit 31 and classifies various kinds of information in the extracted low level data d40 for each recognized external device (S105).

(Step S107: Generation of Circumstance Data)

Then, the data recording unit 107 acquires information indicating a circumstance when the external device is recognized for each external device recognized during the first period on the basis of the information classified from the low level data d40. For example, the data recording unit 107 acquires time when the external device is recognized, a position when the external device is recognized or a detection result (video or audio) of an external environment when the external device is recognized as the information indicating the circumstance on the basis of the information classified from the low level data d40.

Further, the data recording unit 107 may cause the analyzing unit 109 to acquire information indicating a further detailed circumstance on the basis of the information classified from the low level data d40.

(Determination as to Whether or not the External Device is Moving)

For example, the analyzing unit 109 estimates whether or not the position of the external device fluctuates on the basis of change of radio field strength of a radio signal from the external device, which is recorded in the low level data d40 as the recognition result of the external device. The analyzing unit 109 may then acquire information indicating whether or not the external device is moving on the basis of the estimation result as to whether or not the position of the external device fluctuates and change of position information of the information processing apparatus 10 recorded as the low level data d40. For example, FIG. 6 is an explanatory diagram for explaining an example of a method for determining whether or not the external device is moving.

Figures 6, 7:
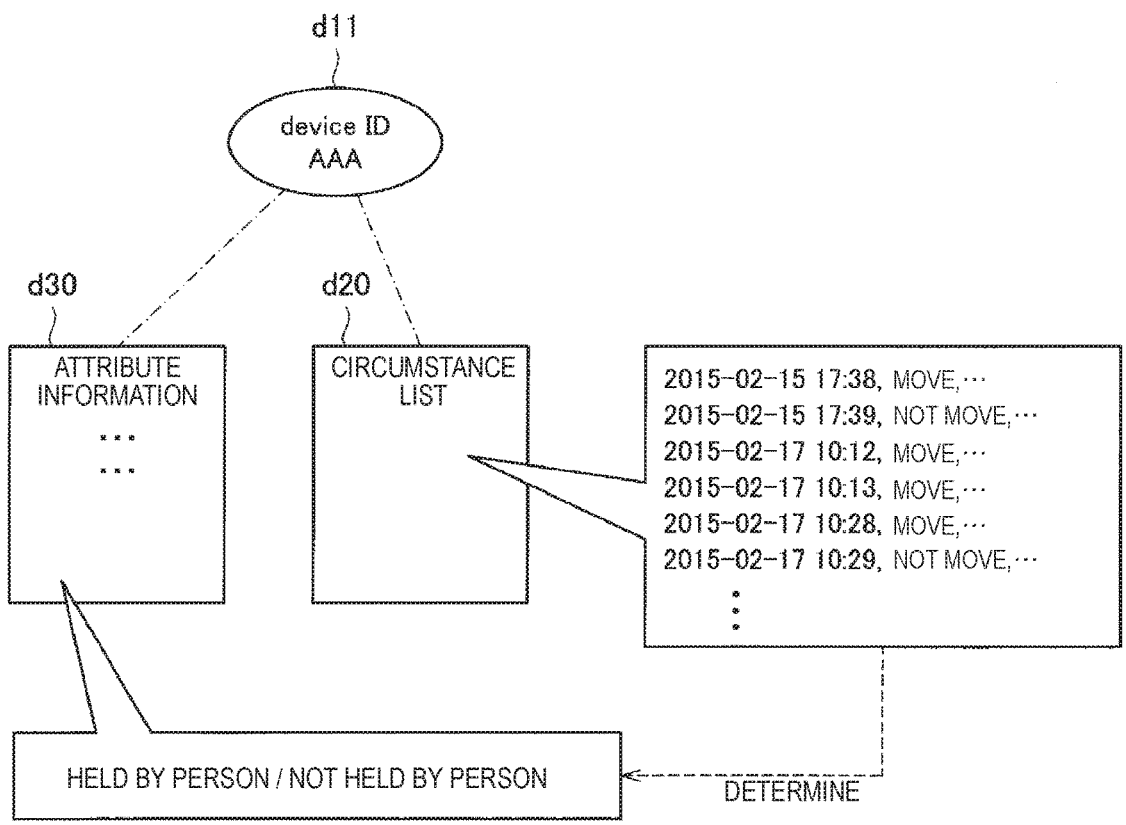
FIG. 6 is an explanatory diagram for explaining an example of operation relating to generation or updating of the real graph by the information processing apparatus according to the embodiment.
FIG. 7 is an explanatory diagram for explaining an example of operation relating to generation or updating of the real graph by the information processing apparatus according to the embodiment.

As illustrated in FIG. 6, for example, the analyzing unit 109 recognizes that the external device is not moving in the case where the information processing apparatus 10 (own device) remains stationary and a position of a target external device (target device) does not fluctuate.

Further, the analyzing unit 109 recognizes that the external device is moving in the case where the information processing apparatus 10 (own device) remains stationary and the position of the target external device (target device) fluctuates. Note that, in this case, a circumstance can be assumed where the external device is moving by being held by a person or where the external device itself is configured to be able to move.

Further, the analyzing unit 109 recognizes that the external device is moving in the case where the information processing apparatus 10 (own device) is moving and the position of the target external device (target device) does not fluctuate. Note that, in this case, a circumstance can be assumed where the external device is held by the user of the information processing apparatus 10 or held by other users who act with the user.

Note that, in the case where the information processing apparatus 10 (own device) is moving and the position of the target external device (target device) fluctuates, there is a case where it is difficult to determine whether or not the external device is moving. In this case, the analyzing unit 109 may recognize that it is unclear whether or not the external device is moving. Note that the analyzing unit 109 may recognize that the external device is not moving in the case where change of a moving amount of the information processing apparatus 10 coordinates with change of signal strength of a radio signal from the external device.
(Acquisition of Information Indicating Location)

Further, the analyzing unit 109 may acquire information indicating a location where the external device is recognized (such as, for example, office, school and live venue) as information indicating the above-described information on the basis of the location information recorded as the low level data d40.

Note that a method for associating each position information with information indicated by the position information is not particularly limited. As a specific example, the user may associate each position information with information indicating a location corresponding to the position information.

Further, as another example, the information processing apparatus 10 (for example, the analyzing unit 109) may estimate a location indicated by each position information on the basis of history of the detected behavior of the user. In this case, for example, the information processing apparatus 10 may estimate a location indicated by the position information on the basis of relationship between the acquired position information and time at which the position information is acquired. More specifically, the information processing apparatus 10 may estimate that position information acquired at time when the user sleeps such as midnight indicates "home" of the user. Further, as another example, the information processing apparatus 10 may estimate that position information acquired during commuting time of the user indicates a "commuting route" of the user. In a similar manner, the information processing apparatus 10 may estimate that position information indicating an arrival point of the commuting route or position information acquired at time when the user is working such as daytime indicates "office" of the user.

Further, the information processing apparatus 10 may acquire information indicating correspondence relationship between each position information (information of longitude and latitude) and a location indicated by the position information (for example, a spot such as library and a live house) from an external apparatus such as a server and may utilize the information.
(Acquisition of Information Relating to Users Located Around User)

Further, the analyzing unit 109 may acquire from a detection result (video and audio) of an external environment when the external device is recognized, recorded as the low level data d40, information relating to other users (for example, the faces and speech) located around the user at that time. Specifically, the analyzing unit 109 may acquire information of the faces of other users located around the user at that time by analyzing the acquired video on the basis of a face recognition technology. Further, the analyzing unit 109 may detect a speech segment by performing acoustic analysis on the acquired audio (for example, speech and environmental sound) and may acquire acoustic information (that is, speech information) during the speech segment as speech information of other users located around the user at that time. Further, in this event, the analyzing unit 109 may distinguish between speech information of the user and speech information of other users on the basis of information indicating characteristics of speech of the user of the information processing apparatus 10 registered in advance.
(Acquisition of Conversation Content)

Further, as another example, the analyzing unit 109 may acquire an acquisition result of speech information of other users located around the user and speech information of the user of the information processing apparatus 10 as information indicating conversation content. Further, in this event, the analyzing unit 109 may convert the speech information to character information by performing analysis based on a speech recognition technology on the speech information and may acquire the character information as the information indicating conversation content.

Note that the above-described example is merely an example, and types of the above-described information relating to the circumstance and a method for acquiring the information are not particularly limited if the information can be acquired on the basis of information recorded as the low level data d40.

As described above, as illustrated in FIG. 5, the data recording unit 107 acquires information indicating a circumstance when the external device is recognized for each external device recognized during the first period and generates circumstance data d21 for each external device on the basis of the information.
(Step S109: Add Circumstance Data to Circumstance List)

Then, as illustrated in FIG. 5, the data recording unit 107 adds the circumstance data d21 generated for each external device to the circumstance list d20 associated with the node d11 indicating the external device in the real graph. By this means, information indicating a circumstance when the target external device is recognized (that is, circumstance data d21) is recorded in the circumstance list d20 in chronological order.

In this manner, the data recording unit 107 updates the circumstance list d20 for the external device recognized during the first period for each of the above-described first period on the basis of the low level data d40 recorded during the first period.
(Step S113: Update Attribute Information on the Basis of Circumstance List)

Then, when a predetermined second period which is longer than the first period has elapsed (S111: Yes), the data recording unit 107 causes the analyzing unit 109 to analyze the circumstance list d20 corresponding to the external device for each external device recorded in the real graph. The data recording unit 107 then updates the attribute information d30 corresponding to the external device on the basis of an analysis result of the circumstance list d20 for each external device.
(Determination as to Whether or not External Device is Held by Person)

For example, FIG. 7 is an explanatory diagram for explaining an example of processing relating to updating of the attribute information d30. In the example illustrated in FIG. 7, the analyzing unit 109 determines whether or not the external device is held by a person on the basis of information indicating whether or not the target external device is moving, recorded in respective pieces of circumstance data d21 in the circumstance list d20.

More specifically, the analyzing unit 109 determines that the target external device is held by a person in the case where the number of times or frequency of the external device being determined as a moving device exceeds a threshold, on the basis of respective pieces of circumstance data d21 accumulated in the circumstance list d20.

Further, the analyzing unit 109 determines whether or not the device is held by a person by performing determination in combination with other information recorded in the circumstance data d21 in the case where the number of times or frequency of the external device being determined as a moving device is equal to or less than the threshold (eventually, in the case where the external device is constantly determined as a device which is not moving).

More specifically, even in the case where the number of times or frequency of the external device being determined as a moving device is equal to or less than the threshold, in the case where a location where the target external device is recognized is different, it is difficult to determine whether or not the target device is held by a person. In this case, the analyzing unit 109 may suspend determination at the time.

Further, in the case where the number of times or frequency of the external device being determined as a moving device is equal to or less than the threshold and a location where the target external device is recognized is always the same, it can be inferred that the target external device is a device fixed at the location (such as, for example, an access point of Wi-Fi). Therefore, in this case, the analyzing unit 109 may determine that the target external device is a device which is not held by a person.

Further, in this event, the analyzing unit 109 may specify a plurality of external devices with high correlation from correlation of information indicating a circumstance such as change of position information and a time slot in which the external device is recognized, among a plurality of external devices. In this case, the analyzing unit 109 may associate a plurality of external devices with each other assuming that a plurality of external devices with higher correlation are external devices held by the same user or external devices provided at the same location. Further, the analyzing unit 109 may determine an external device with higher correlation with the information processing apparatus 10 (for example, an external device with high correlation for longer than a predetermined period of the day) as an external device held by the user of the information processing apparatus 10.

Note that there can be a case where an external device which has been determined in the past as a device not held by a person is determined as a device held by a person on the basis of the circumstance data d21 added later. As a specific example, in the case where the target external device satisfies conditions for determination as the above-described device held by a person by the circumstance data d21 being added, the analyzing unit 109 may determine the external device as a device held by a person. In this case, the data recording unit 107 updates the attribute information d30 of the target external device on the basis of a determination result of the analyzing unit 109.

Further, the analyzing unit 109 can perform more accurate determination (determination closer to an actual situation) as the number of pieces of accumulated circumstance data d21 is larger, because of characteristics of processing as described above. From such characteristics, in the case where the number of pieces of circumstance data d21 corresponding to the target external apparatus is smaller than a threshold (that is, in the case where it is difficult to perform accurate determination), the analyzing unit 109 may deal with the external device as a device for which it is not yet determined as to whether or not the external device is held by a person.

(Narrowing Down of Information Relating to User)

Further, the analyzing unit 109 may narrow down a candidate of information relating to the user of the target external device on the basis of information relating to other users located around the user, recorded in respective pieces of the circumstance data d21 in the circumstance list d20. As a specific example, the analyzing unit 109 may narrow down a candidate of the face of the user of the target external device by comparing recognition results of the faces of other users recorded in respective pieces of circumstance data d21 in the circumstance list d20 among the circumstance data d21. In a similar manner, the analyzing unit 109 may narrow down a candidate of speech of the user of the target external device by comparing recognition results of speech of other users recorded in respective pieces of circumstance data d21 in the circumstance list d20 among the circumstance data 21.

(Acquisition of Relationship Among Users)

Further, the analyzing unit 109 may acquire information indicating relationship between the user of the information processing apparatus 10 and the user of the target external device on the basis of information indicating a location or a position, recorded in respective pieces of circumstance data d21 in the circumstance list d20. As a specific example, the analyzing unit 109 may recognize that relationship with the user of the information processing apparatus 10 is a "person relating to office" for the user of the external device for which the number of times or frequency of the external device being recognized at the "office" exceeds a threshold. Further, as another example, the analyzing unit 109 may recognize that the above-described relationship is "family" for the user of the external device for which the number of times or frequency of the external device being recognized at "home" exceeds a threshold. In a similar manner, the analyzing unit 109 may recognize that the above-described relationship is a "person relating to school of the child" for the user of the external device for which the number of times or frequency of the external device being recognized at the "school of the child".

(Calculation of Intimacy)

Further, the analyzing unit 109 may calculate intimacy between the user of the information processing apparatus 10 and the user of the target external device on the basis of respective pieces of circumstance data d21 in the circumstance list d20. As a specific example, the analyzing unit 109 may calculate the intimacy according to whether or not there is conversation with the user of the target external device, a degree of match of action, or the like. Further, the analyzing unit 109 may calculate the intimacy according to a state or a circumstance where the place is shared (for example, a location where the external device is recognized, or the like). More specifically, the analyzing unit 109 may set higher intimacy for a user who shares a place such as a restaurant where the user can easily communicate than for a user who shares a place on a commuting route or on a commuting train.

(Input of Profile Such as Name)

The data recording unit 107 may register the acquired information in the attribute information d30 in the case where information relating to profile such as name, of the user of the target external device can be acquired.

As a specific example, a case can be assumed where, in an external apparatus such as a server and network service (for example, SNS), information relating to profile of the user of the external device is managed in association with the target external device. In such a case, the data recording unit 107 may acquire the information relating to profile of the user of the target external device by accessing the external device or the network service.

Further, the data recording unit 107 may acquire information relating to profile of the user of the target external device from information input to a function provided by the network service. As a more specific example, in the case where information estimated as profile of the user such as name is included in an article input to diary, or the like, provided by the network service, the data recording unit 107 may extract the information as the information relating to profile of the user of the target external device. Note that, in the case where the data recording unit 107 acquires the information relating to profile of the user of the external device, the data recording unit 107 may inquire whether or not to register the information in the attribute information d30, to the user via a notifying unit 113 such as a display.

Further, the data recording unit 107 may acquire the information relating to profile of the user of the target external device on the basis of user input through the input unit 115. Note that the data recording unit 107 may encourage the user of the information processing apparatus 10 to input the information relating to the profile of the external device recognized during the second period.

As a more specific example, the data recording unit 107 may present a question such as "with whom did you eat lunch today?" to the user and may register information (for example, name) of the user input as a response to the question in the attribute information d30 of the external device recognized at lunchtime of that day. Further, as another example, the data recording unit 107 may notify the user that the recognized external device is an external device held by another user faced by the user by presenting information relating to the recognized external device to the user of the information processing apparatus 10 via the notifying unit 113 such as a display, to encourage the user to input the information relating to the profile of the another user. Note that the data recording unit 107 may execute operation for encouraging the user of the information processing apparatus 10 to input the information relating to the profile of the user of the external device described above only in the case where specific conditions are satisfied (for example, in the case where intimacy exceeds a threshold).

In this manner, the data recording unit 107 updates the attribute information d30 corresponding to the external device on the basis of an analysis result of the circumstance list d20 for each external device recorded in the real graph for each of the above-described second period.

As described above, the information processing apparatus 10 executes each processing relating to recording of the low level data d40, addition of the circumstance data d21 to the circumstance list d20 and updating of the attribute information d30 as appropriate unless it is instructed to finish a series of processing (step S115: No). The information processing apparatus 10 then finishes execution of various kinds of processing described above in the case where it is instructed from the user to finish the series of processing (step S115: Yes).

Details of operation of the information processing apparatus 10 according to the present embodiment, particularly, operation relating to generation or updating of the real graph has been described above with reference to FIG. 4 to FIG. 7 along with an example of the flow of the series of processing.

4. EXAMPLE OF OPERATION BASED ON REAL GRAPH

Figure 8:
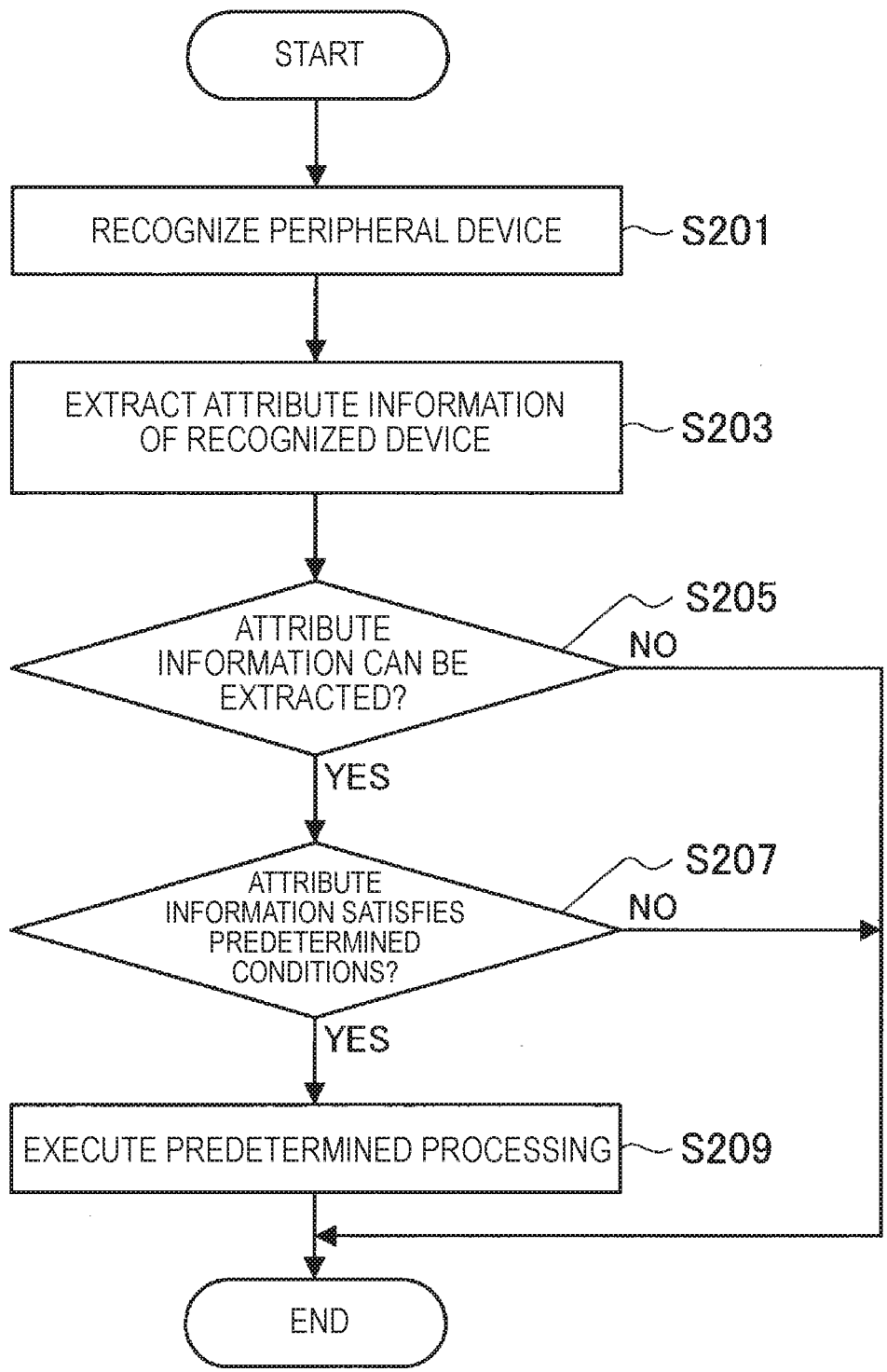
FIG. 8 is an explanatory diagram for explaining an example of operation based on the real graph, by the information processing apparatus according to the embodiment.

Details of the operation of the information processing apparatus 10 according to the present embodiment, particularly, the operation based on the real graph in the case where an external device is recognized will be described next with reference to FIG. 8 along with an example of the flow of the series of processing. FIG. 8 is an explanatory diagram for explaining an example of the operation based on the real graph by the information processing apparatus 10 according to the present embodiment.

(Step: S201: Recognize External Device)

The processing executing unit 111 acquires a recognition result of an external device from the device recognizing unit 103. By this means, the processing executing unit 111 can recognize an external device located around the information processing apparatus 10 (that is, an external device of another user who shares a place with the user of the information processing apparatus 10).

(Step S203: Confirm Attribute Information of Recognized External Device)

The processing executing unit 111 then extracts the attribute information d30 corresponding to the recognized external device with reference to the real graph stored in the storage unit 31.

(Step S205: Execute Processing)

In the case where the attribute information d30 can be extracted (step S205: Yes), and information in the attribute information d30 satisfies predetermined conditions (step S207: Yes), the processing executing unit 111 executes processing determined in advance according to the conditions. Note that, in this event, the processing executing unit 111 may execute the processing only for an external device held by a person.

(Notification of Information)

As a specific example, the processing executing unit 111 may cause the notifying unit 113 to give a notification of notification information relating to the external device or the user of the external device recorded in the attribute information d30 for the external device for which the attribute information d30 can be extracted. Further, in this event, the processing executing unit 111 may cause the notifying unit 113 to give a notification of the notification information according to information indicating relationship with the user of the external device recorded in the attribute information d30. More specifically, the processing executing unit 111 may cause the notifying unit 113 to give a notification of the notification information in the case where intimacy with the user of the external device exceeds a threshold. By this means, in the case where an external device located around the user is recognized, the user of the information processing apparatus 10 can recognize that the user has shared a place with the user of the external device in the past.

Further, the processing executing unit 111 may present the information recorded in respective pieces of circumstance data d21 in the circumstance list d20 to the user of the information processing apparatus 10 via the notifying unit 113. As a more specific example, the processing executing unit 111 may extract information indicating content of conversation between the user of the information processing apparatus 10 and the user of the external device from the circumstance data d21 in the circumstance list d20 and may present the extracted information to the user of the information processing apparatus 10 via the notifying unit 113. By this means, in the case where the user of the information processing apparatus 10 meets a user whom the user of the information processing apparatus 10 has met in the past, the user of the information processing apparatus 10 can recall content of the conversation with the user in the past.

(Control of Various Kinds of Functions)

Further, in the case where the extracted information in the attribute information d30 satisfies predetermined conditions, the processing executing unit 111 may control operation of functions (for example, application) determined in advance according to the conditions. As a specific example, in the case where the processing executing unit 111 recognizes that the user shares a place with a user with high intimacy, the processing executing unit 111 may suppress operation of a function for communicating with other users different from the user through voice call, or the like. Further, in the case where the processing executing unit 111 recognizes that the user shares a place with a user with high intimacy, the processing executing unit 111 may control operation of a messaging function provided by network service such as SNS so that information indicating that the user is in the middle of something is presented.

Further, as another example, in the case where another external device which is different from the external device with high correlation with the information processing apparatus 10 (that is, an external device held by the user of the information processing apparatus 10) is recognized, the processing executing unit 111 may recognize that there exists another user around the user. In such a case, for example, the processing executing unit 111 may suppress output of audio from acoustic device such as an open speaker.

Note that the above-described example is merely an example, and content of the processing and a timing at which the processing is executed are not particularly limited if the information processing apparatus 10 (processing executing unit 111) can execute predetermined processing according to the information recorded in the real graph such as the attribute information d30.

As a specific example, the information processing apparatus 10 may visualize the generated real graph (see, for example, FIG. 3) as display information and may present the display information to the user through the notifying unit 113 such as a display. Further, the information processing apparatus 10 may present information relating to a user of the external device recognized that day to the user of the information processing apparatus 10 on the basis of the real graph. By this means, the user of the information processing apparatus 10 can recognize another user with whom the user has shared a place, particularly, another user for whom it has not been recognized that the user has shared a place (for example, an unacquainted user).

Further, the information processing apparatus 10 may use information registered in the real graph as input information for executing other functions on the basis of an instruction from the user. As a more specific example, the information processing apparatus 10 may automatically generate an article (or a template of the article) in which information such as "when", "with whom" and "what one is doing" is presented as input information to a diary function, or the like, provided by network service such as SNS on the basis of the information registered in the real graph.

Details of operation based on the real graph among the operation of the information processing apparatus 10 according to the present embodiment, particularly, operation in the case where the external device is recognized has been described above with reference to FIG. 8 along with an example of the flow of the series of processing.

5. MODIFIED EXAMPLES

Modified examples of the information processing apparatus 10 according to the present embodiment will be described next.

5.1. Modified Example 1: Determination Method Utilizing Machine Learning

First, as modified example 1, an example where the information processing apparatus 10 acquires more detailed information relating to a circumstance, an external device, a user of the external device, or the like, on the basis of machine learning, using accumulated information such as low level data and circumstance data as input will be described with reference to FIG. 9 to FIG. 12. FIG. 9 to FIG. 12 are explanatory diagrams for explaining the information processing apparatus 10 according to modified example 1. Note that, in the present description, a case will be described as an example where the information processing apparatus 10 determines whether or not a target external device is held by a person on the basis of machine learning. Further, in the present description, there is a case where a subject of the determination will be referred to as a "recognizer". Note that the above-described analyzing unit 109 corresponds to an example of the recognizer.

(Accumulation of Teacher Data)

First, by inputting teacher data which is used as reference for determining whether or not a target external device is held by a person, to the recognizer in advance, the teacher data is accumulated in the recognizer. For example, FIG. 9 illustrates an example of the teacher data to be input to the recognizer.

Figure 9:
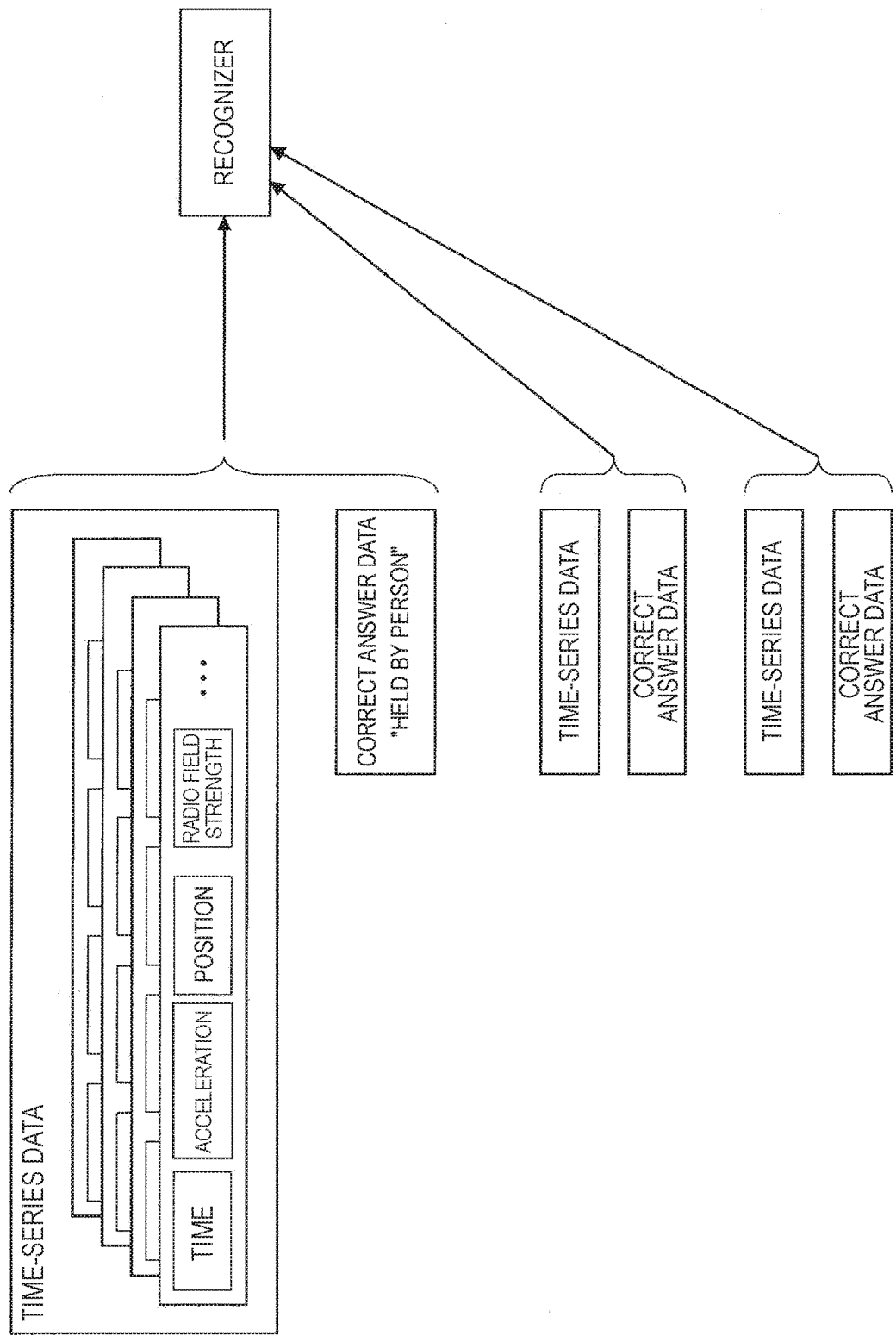
FIG. 9 is an explanatory diagram for explaining an information processing apparatus according to modified example 1.

In the example illustrated in FIG. 9, the teacher data is generated by time-series data and correct answer data being associated with each other. The time-series data is formed by information for determining whether or not the target external device is held by a person, such as "acceleration", "position" and "radio field strength" being associated with information indicating "time" and being accumulated in chronological order. That is, the time-series data indicates change of "acceleration", "position", "radio field strength", or the like, in chronological order. Note that information such as "acceleration", "position" and "radio field strength" accumulated as the time-series data can correspond to input information (for example, information detected by a predetermined detecting unit) to be used when the recognizer determines whether or not the target external device is held by a person.

The teacher data is generated by the correct answer data indicating a determination result as to whether or not the external device is held by a person in the case where the time-series data is input being associated with such time-series data, and the teacher data is input to the recognizer. By this means, the recognizer learns what determination (that is, whether or not the external device is heled by a person) is made for the input in the case where what kind of information is input.

Note that the above-described teacher data may be generated in advance on the basis of a result of experiment, or the like, in the past. Further, as another example, the recognizer may generate the teacher data on the basis of the time-series data acquired as input and a determination result of the recognizer based on the time-series data.

(Determination Based on Learning Result)

Operation in the case where the recognizer determines whether or not the target external device (for example, the recognized external device) is held by a person on the basis of a learning result for the time-series data acquired as input will be described next. Note that, in the present description, a case will be described as an example where the recognizer determines whether the external device is held by a person on the basis of a moving amount (that is, change of a position and acceleration) of the information processing apparatus 10 (own device), acquired as the time-series data, and change of radio field strength of a radio signal from the external device.

Figure 10:
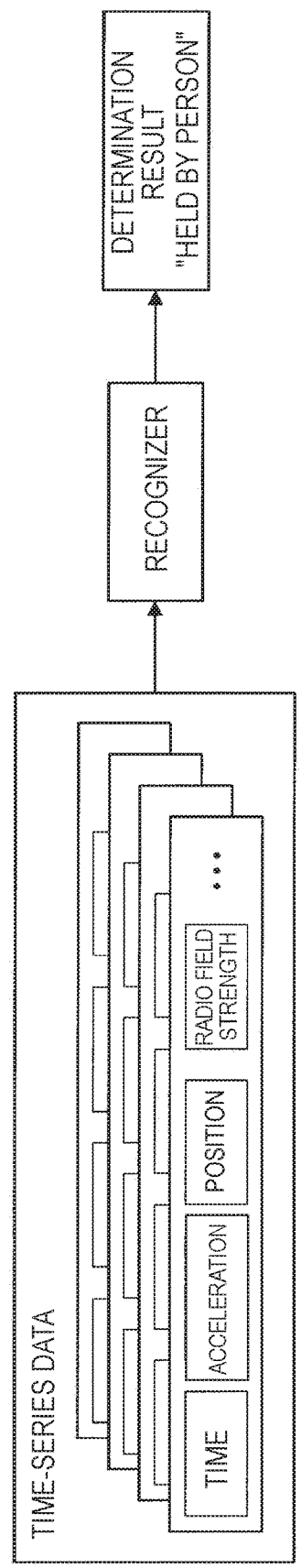
FIG. 10 is an explanatory diagram for explaining an information processing apparatus according to modified example 1.

First, outline of operation relating to determination based on the learning result by the recognizer will be described with reference to FIG. 10. As illustrated in FIG. 10, the recognizer acquires the time-series data when the external device is recognized as input information for each target external device. The recognizer then determines whether or not the target external device is held by a person on the basis of the acquired time-series data and the previous learning result (in other words, teacher data accumulated in advance).

Figure 11:
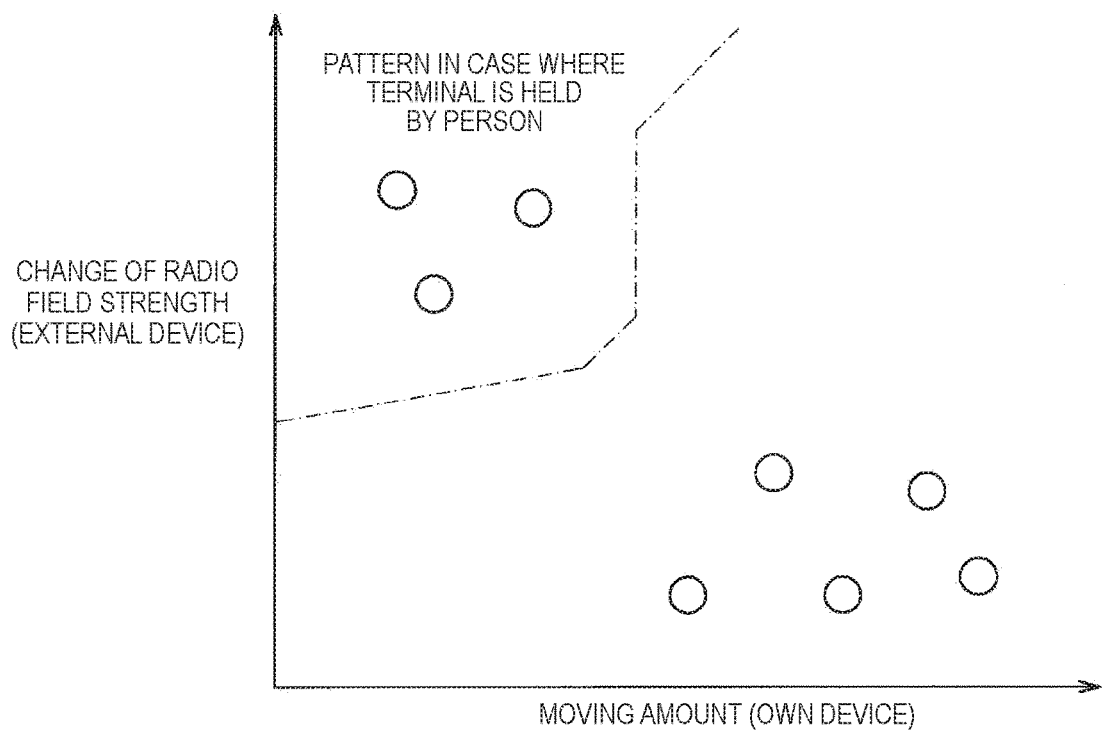
FIG. 11 is an explanatory diagram for explaining an information processing apparatus according to modified example 1.

Here, processing relating the above-described determination by the recognizer will be described in more detail using a specific example with reference to FIG. 11 an FIG. 12. For example, FIG. 11 schematically illustrates relationship between a moving amount of the information processing apparatus 10 and radio field strength of a signal from an external device, and a determination result as to whether or not the external device is held by a person, based on the teacher data (that is, the learning result) accumulated in advance. That is, the example illustrated in FIG. 11 indicates that, particularly, in the case where the moving amount of the information processing apparatus 10 is small (or the information processing apparatus 10 does not move) and change of the radio field strength of the signal from the external device is large, there is strong tendency that it is determined that the external device is held by a person.

Figure 12:
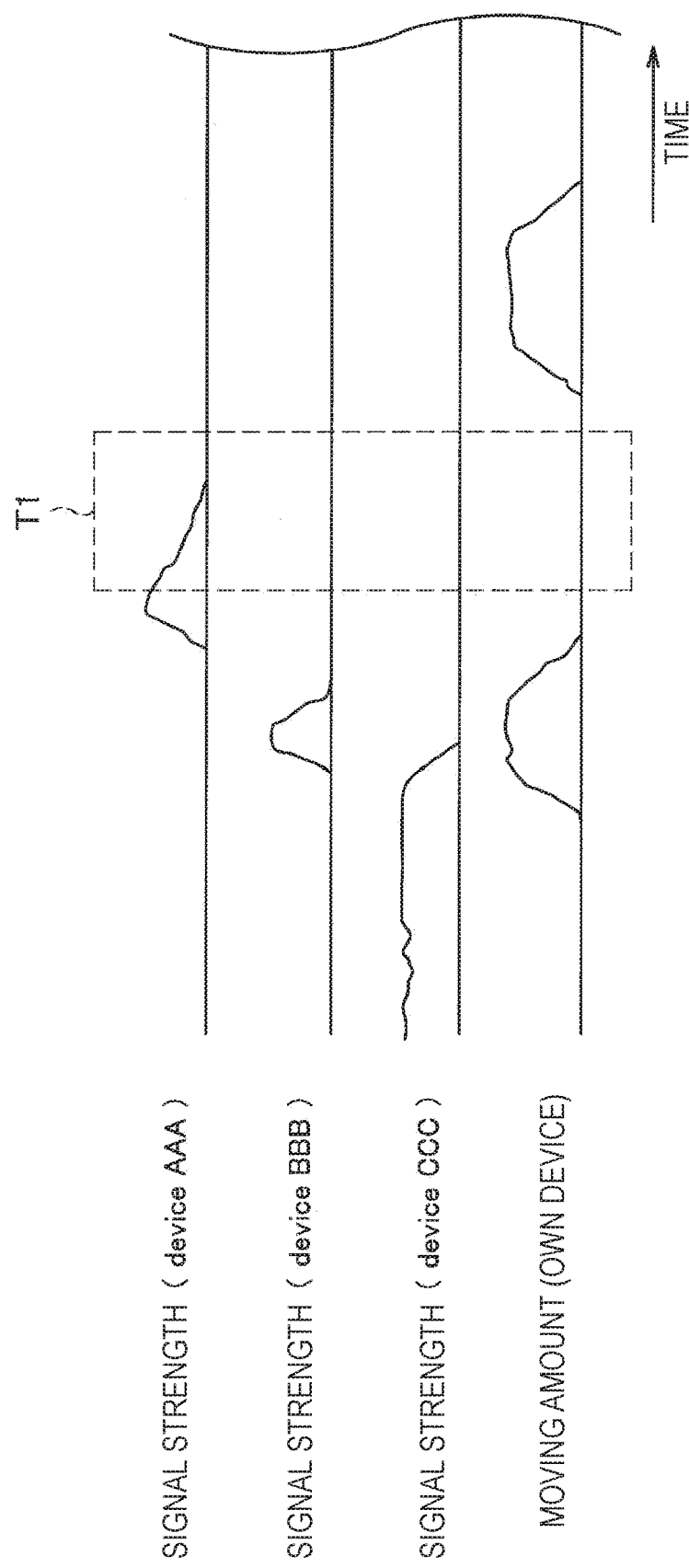
FIG. 12 is an explanatory diagram for explaining an information processing apparatus according to modified example 1.

Further, FIG. 12 illustrates an example of the time-series data input to the recognizer. The example illustrated in FIG. 12 schematically illustrates the time-series data as time-series change of each of the moving amount of the information processing apparatus 10 (own device) and signal strength of a radio signal from the recognized external device. Note that the example illustrated in FIG. 12 illustrates change of the signal strength of the radio signal from the external device for each of external devices "AAA", "BBB" and "CCC".

Here, in FIG. 12, attention is focused on a period indicated with reference symbol T1. In a period T1, while there is no change in the moving amount of the information processing apparatus 10, there is change in signal strength of a radio signal from the external device AAA. In this case, the recognizer checks the acquired time-series data relating to the external device AAA against the accumulated teacher data and determines that the external device AAA is held by a person from tendency based on the teacher data (see, for example, FIG. 11). More specifically, the recognizer may recognize that the external device AAA moves so as to gradually separate from the information processing apparatus 10 because the radio signal from the external device AAA gradually attenuates while the information processing apparatus 10 does not move in the period T1.

Meanwhile, in the period T1, for the external devices BBB and CCC, change of signal strength of the radio signals is not detected. Therefore, the recognizer may determine that the external devices BBB and CCC are not held by a person from tendency based on the accumulated teacher data (see, for example, FIG. 11).

Note that, as described above, the recognizer may generate new teacher data on the basis of the time-series data acquired as the input information and the determination result based on the time-series data and the previous learning result and may accumulate the teacher data as a learning result.

An example of a case where the information processing apparatus 10 acquires more detailed information relating to a circumstance, an external device, a user of the external device, or the like, on the basis of machine learning has been described above as modified example 1.

5.2. Modified Example 2: Example of Information Sharing Via Server

Figure 13:
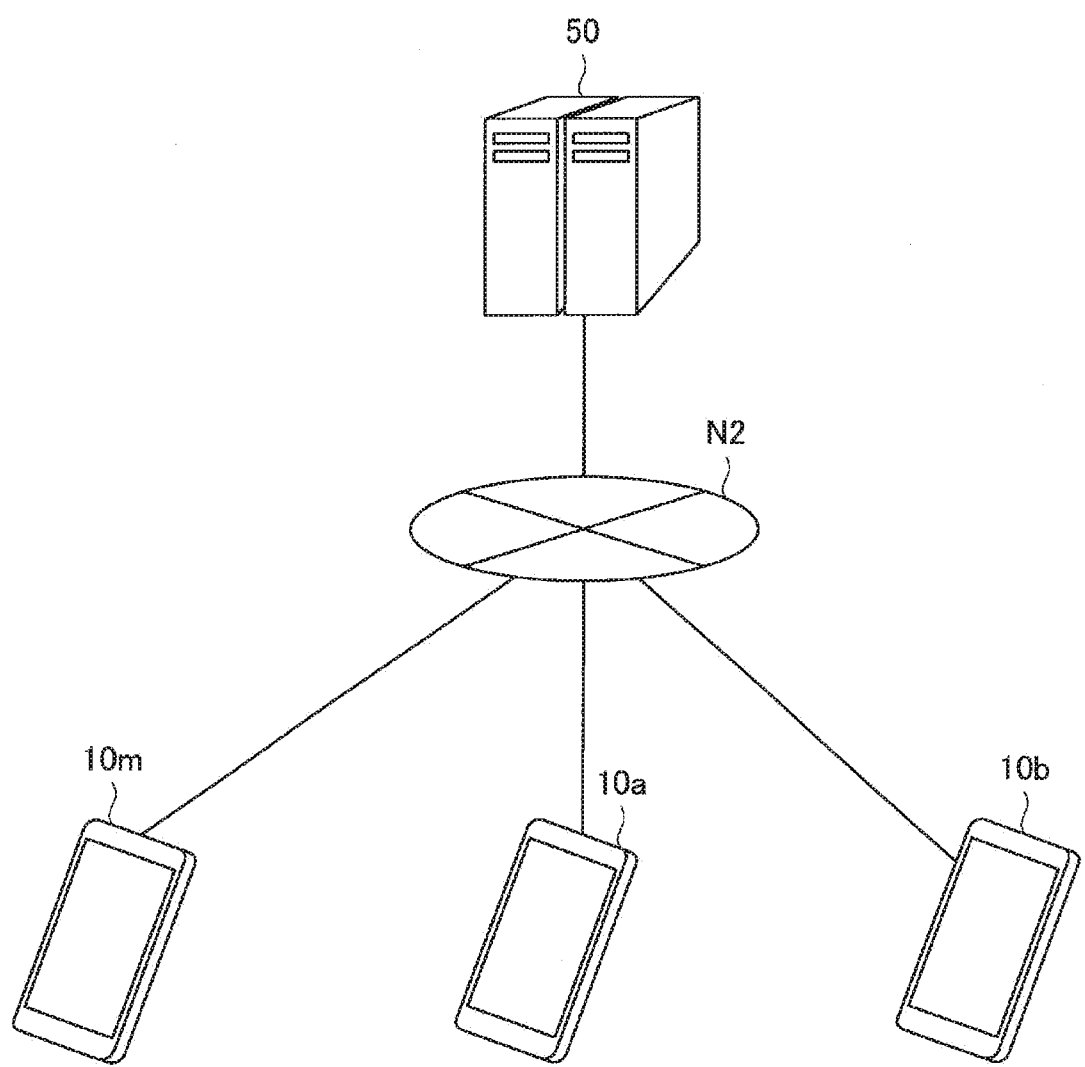
FIG. 13 is an explanatory diagram for explaining an information processing apparatus according to modified example 2.
Figure 14:
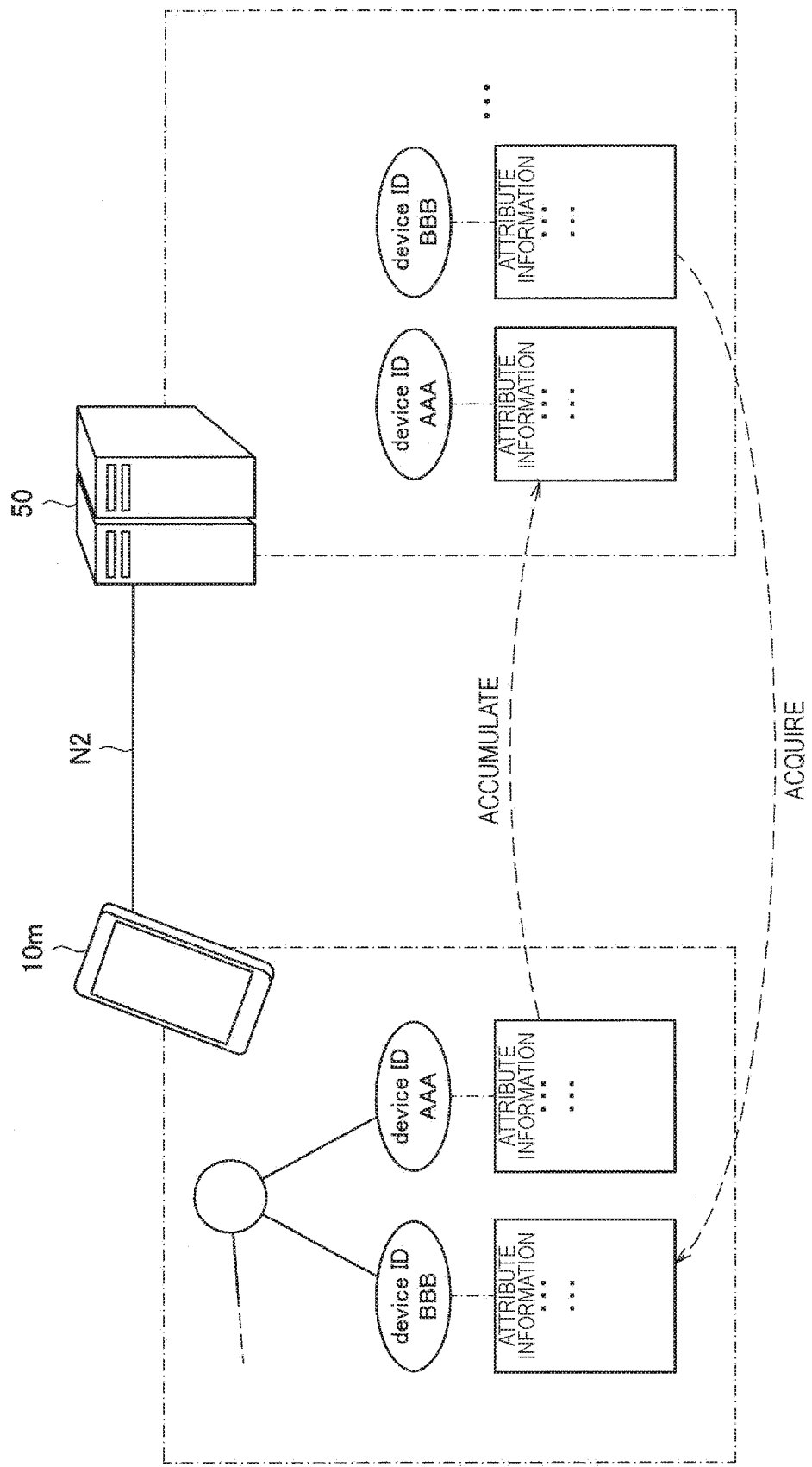
FIG. 14 is an explanatory diagram for explaining an information processing apparatus according to modified example 2.

Next, as modified example 2, an example of a case where various kinds of information (for example, attribute information acquired for each external device) accumulated as the real graph is shared among a plurality of information processing apparatuses 10 by utilizing an external apparatus such as a server (for example, cloud) will be described with reference to FIG. 13 and FIG. 14. FIG. 13 and FIG. 14 are explanatory diagrams for explaining the information processing apparatus 10 according to modified example 2.

For example, FIG. 13 illustrates an example of a system to which the information processing apparatus 10 according to modified example 2 is applied. As illustrated in FIG. 13, in the system according to modified example 2, each of a plurality of information processing apparatuses 10m, 10a and 10b and a server 50 are connected via a network N2 so that information can be transmitted/received to/from each other. As the network N2, for example, an electronic network which connects different apparatuses, such as the Internet, a leased line, a local area network (LAN) and a wide area network (WAN) can be assumed.

Next, outline of operation of the system according to modified example 2 will be described with reference to FIG. 14. Particularly, the outline of the operation will be described while attention is focused on relationship between the information processing apparatus 10m and the server 50.

For example, the information processing apparatus 10m may upload at least part of information among attribute information acquired by the information processing apparatus 10m for each external device to the server 50 via the network N2.

As a more specific example, the information processing apparatus 10m may upload information indicating a determination result as to whether or not the target external device is held by a person acquired as the attribute information to the server 50. Further, as another example, the information processing apparatus 10m may upload information relating to profile of a user of the target external device to the server 50. Still further, as another example, the information processing apparatus 10m may upload the generated or updated real graph itself to the server 50. In this case, the server 50 may integrate real graphs uploaded from respective information processing apparatuses 10.

Note that the above-described operation is performed not only in the information processing apparatus 10m but also similarly performed in other information processing apparatuses 10a and 10b connected to the server 50. With such a configuration, various kinds of information (or real graphs themselves) accumulated as the real graphs in the respective information processing apparatuses 10 is aggregated at the server 50.

Further, the information processing apparatus 10m may update a real graph held by the information processing apparatus 10m on the basis of the information aggregated at the server 50. As a more specific example, in the case where a new external device which is not registered in the real graph is recognized, the information processing apparatus 10m may acquire attribute information relating to the external device (for example, information relating to profile of the user of the external device) from the server 50. Further, as another example, the information processing apparatus 10m may acquire the real graph integrated by the server 50 from the server 50.

With the above-described configuration, according to the system according to modified example 2, each information processing apparatus 10 can generate or update the real graph by utilizing the information aggregated at the server 50. Further, because information of respective external devices acquired or recognized by respective information processing apparatuses 10 is aggregated at the server 50, even if an error is included in recognition by part of the information processing apparatuses 10, it is possible to correct the error through self-purification using recognition results by other information processing apparatuses 10. An example of a case where various kinds of information accumulated as the real graph is shared among a plurality of information processing apparatuses 10 by utilizing an external apparatus such as a server has been described above as modified example 2 with reference to FIG. 13 and FIG. 14.

5.3. Modified Example 3: Modified Example of Real Graph

Figure 15:
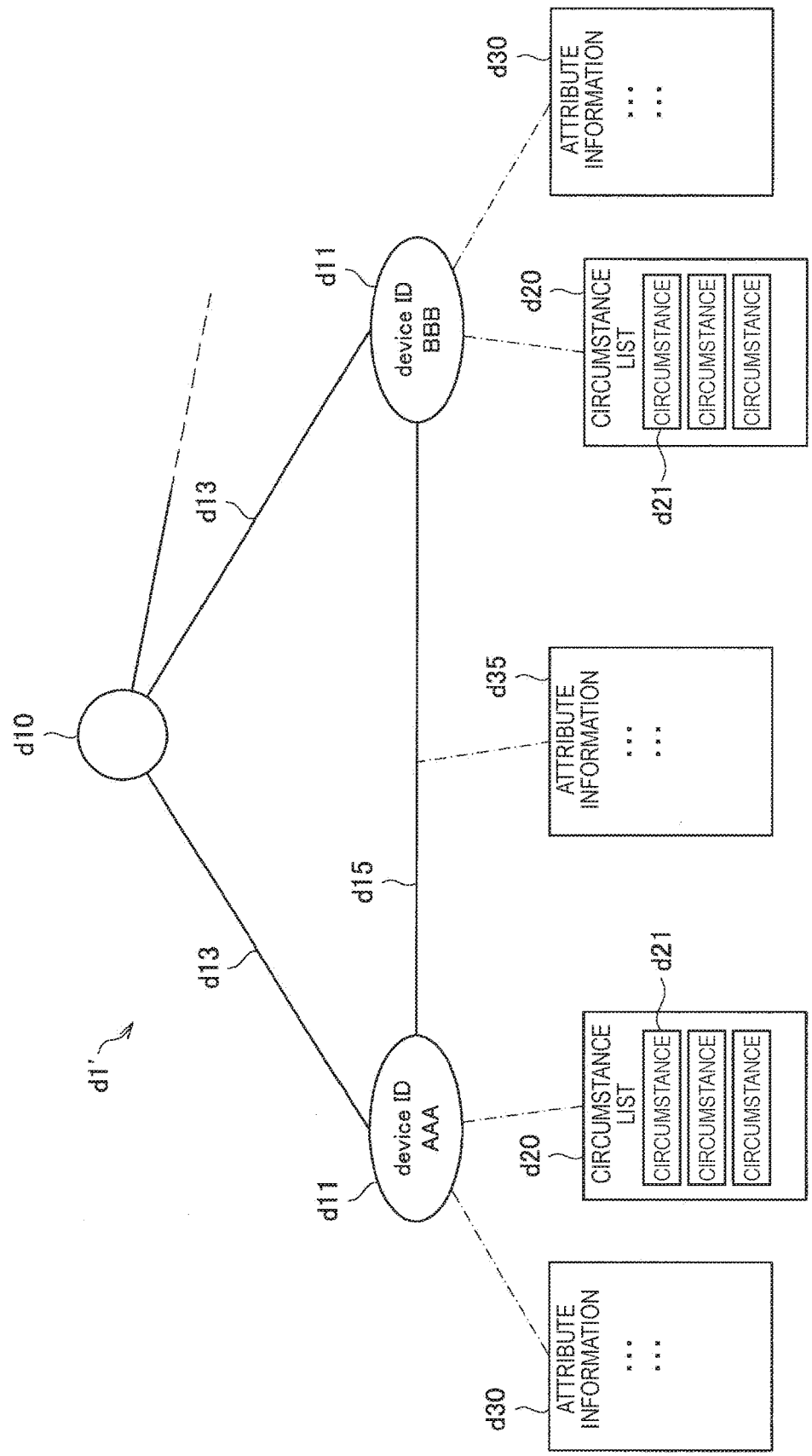
FIG. 15 is an explanatory diagram for explaining an information processing apparatus according to modified example 3.

Next, a modified example of the real graph will be described with reference to FIG. 15 as modified example 3. FIG. 15 is an explanatory diagram for explaining the information processing apparatus 10 according to modified example 3, and illustrates a modified example of the real graph. Note that, in the following description, there is a case where the real graph according to modified example 3 illustrated in FIG. 15 will be referred to as a "real graph dl'" to distinguish from the real graph dl described above with reference to FIG. 3.

As illustrated in FIG. 15, the real graph dl' is different from the real graph dl described with reference to FIG. 3 in that the real graph dl' includes a link d15 which associates nodes d11 corresponding to a plurality of external devices with each other and attribute information d35 associated with the link d15.

As a specific example, the information processing apparatus 10 determines correlation between the external devices "AAA" and "BBB" by checking circumstance lists d20 respectively corresponding to the external devices "AAA" and "BBB" recognized around the same time. More specifically, the information processing apparatus 10 determines that there is high correlation between the external devices "AAA" and "BBB" in the case where the number of times the external devices have been recognized at the same time in the past or frequency of recognition around the same time is equal to or greater than a threshold.

Subsequently, in the case where the information processing apparatus 10 determines that there is high correlation between the external devices "AAA" and "BBB", the information processing apparatus 10 associates the nodes d11 respectively corresponding to the external devices with each other on the basis of the link d15. Further, the information processing apparatus 10 acquires information which can be associated with the both external devices on the basis of respective pieces of circumstance data d21 included in the circumstance lists d20 of the both external devices. As a more specific example, the information processing apparatus 10 may acquire information indicating relationship (such as, for example, "family" and "people relating to office") between the external devices "AAA" and "BBB". Further, as another example, the information processing apparatus 10 may acquire information indicating content of conversation acquired upon recognition of the external devices "AAA" and "BBB" or may acquire information corresponding to theme (topic) by analyzing content of the conversation.

The information processing apparatus 10 then generates the attribute information d35 on the basis of the acquired information and associates the attribute information d35 with the link d15 which associates the external devices "AAA" and "BBB" with each other. Note that, in the case where the attribute information d35 has already been associated with the link d15, the information processing apparatus 10 may update the attribute information d35 on the basis of the acquired information.

Further, as described above, the information processing apparatus 10 may visualize the real graph dl' illustrated in FIG. 15 as display information and may present the display information to a user of the information processing apparatus 10 via the notifying unit 113 such as a display. By this means, the user of the information processing apparatus 10 can recognize relationship between the external devices "AAA" and "BBB" or users of the external devices "AAA" and "BBB".

Note that the example of the real graph dl' illustrated in FIG. 15 is merely an example, and the method and a data format of the real graph dl' are not particularly limited if information which can relate to the both external devices with high correlation among the plurality of external devices can be associated with the external devices. As a specific example, in the example illustrated in FIG. 15, the attribute information d35 may be associated with the both nodes d11 respectively corresponding to the external devices "AAA" and "BBB".

The modified example of the real graph has been described above as modified example 3 with reference to FIG. 15.

6. HARDWARE CONFIGURATION

Figure 16:
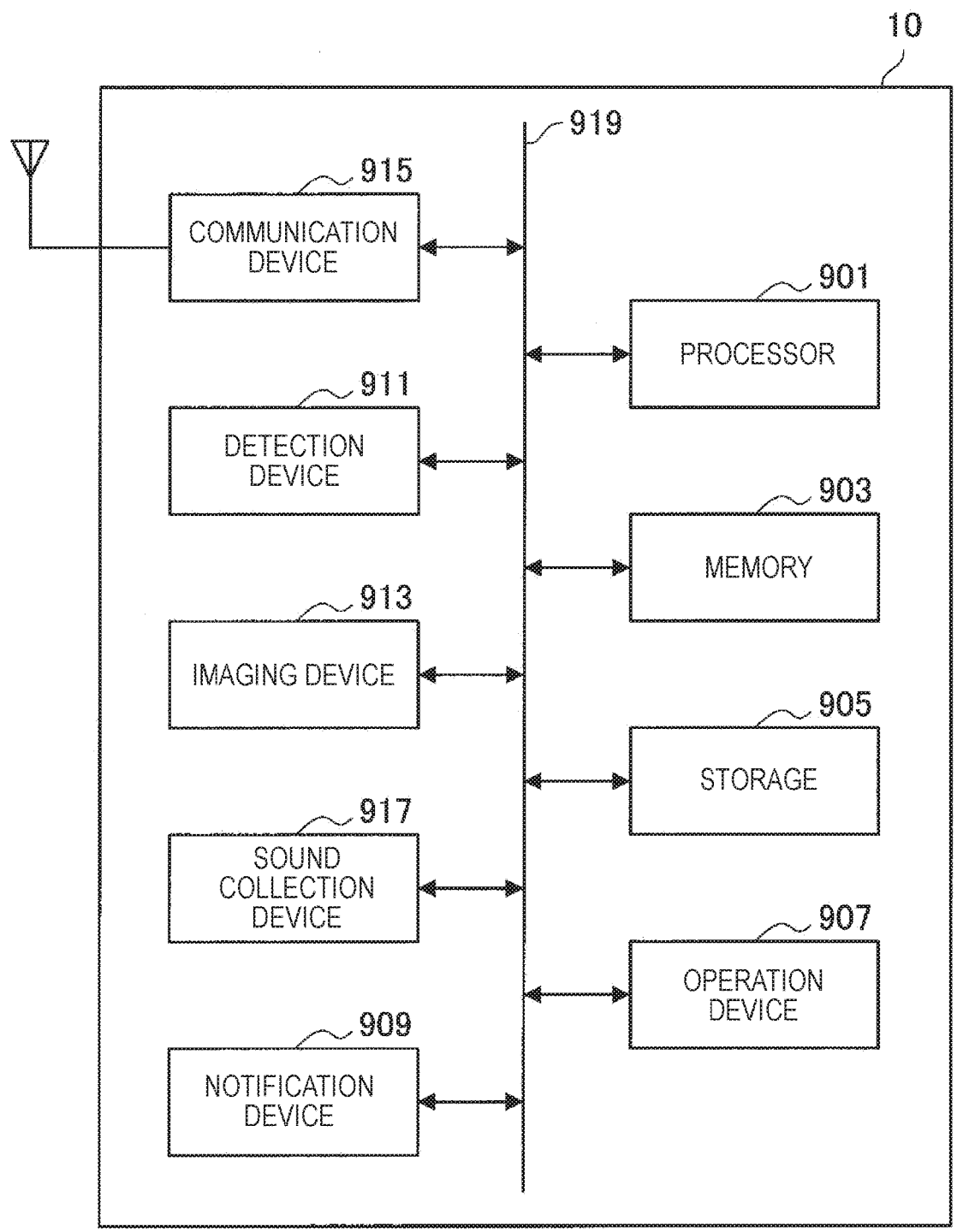
FIG. 16 is a diagram illustrating an example of a hardware configuration of the information processing apparatus according to the embodiment.

Next, an example of a hardware configuration of the information processing apparatus 10 according to an embodiment of the present disclosure will be described with reference to FIG. 16. FIG. 16 is a diagram illustrating an example of the hardware configuration of the information processing apparatus 10 according to an embodiment of the present disclosure.

As illustrated in FIG. 16, the information processing apparatus 10 according to the present embodiment includes a processor 901, a memory 903, a storage 905, an operation device 907, a notification device 909, a detection device 911, a communication device 915, a sound collection device 917, and a bus 919. Further, the information processing apparatus 10 may include an imaging device 913.

The processor 901 may be, for example, a central processing unit (CPU), a graphics processing unit (GPU), a digital signal processor (DSP) or a system on chip (SoC), and executes various processing of the information processing apparatus 10. The processor 901 can be configured with, for example, electronic circuits for executing various kinds of arithmetic processing. Note that the above-described device recognizing unit 103, the data recording unit 107, the analyzing unit 109 and the processing executing unit 111 can be realized with the processor 901.

The memory 903 includes a random access memory (RAM) and a read only memory (ROM), and stores a program and data to be executed by the processor 901. The storage 905 can include a storage medium such as a semiconductor memory and a hard disk. For example, the above-described storage unit 31 can be realized with at least one of the memory 903 and the storage 905 or combination of the memory 903 and the storage 905.

The operation device 907 has a function of generating an input signal for allowing the user to perform desired operation. The operation device 907 can be configured as, for example, a touch panel. Further, as another example, the operation device 907 may be configured with, for example, an input unit, such as a button, a switch and a keyboard, which allows the user to input information, an input control circuit which generates an input signal on the basis of input by the user and supplies the input signal to the processor 901, or the like. Note that at least part of the configuration of the above-described input unit 115 may be realized with the operation device 907.

The notification device 909 is an example of the output device, and may be a device such as, for example, a liquid crystal display (LCD) apparatus and an organic light emitting diode (OLED) display. In this case, the notification device 909 can notify the user of predetermined information by displaying a screen. Further, the notification device 909 may be a device, such as a speaker, which notifies the user of predetermined information by outputting a predetermined acoustic signal.

Note that the above-described example of the notification device 909 is merely an example, and an aspect of the notification device 909 is not particularly limited if the notification device 909 can notify the user of predetermined information. As a specific example, the notification device 909 may be a device such as a light emitting diode (LED) which notifies the user of predetermined information by a lighting or blinking pattern. Note that the above-described notifying unit 113 can be realized with the notification device 909.

The detection device 911 is a device for detecting various kinds of states. The detection device 911 can be configured with sensors for detecting various kinds of states, such as, for example, a touch sensor, a pressure sensor, an illuminance sensor and a humidity sensor. Further, the detection device 911 may be configured with sensors for detecting contact or proximity of a predetermined target, such as an electrostatic sensor. Further, the detection device 911 may be configured with sensors for detecting change of a position or orientation of a predetermined chassis, such as an acceleration sensor and an angular velocity sensor. Still further, the detection device 911 may be configured with sensors for detecting a predetermined target, such as a so-called optical sensor. Note that at least part of the configuration of the above-described detecting unit 105 can be realized with the detection device 911.

The imaging device 913 includes an imaging element which images a subject and obtains digital data of the imaged image, such as a complementary metal-oxide semiconductor (CMOS) image sensor and a charge coupled device (CCD) image sensor. That is, the imaging device 913 has a function of photographing a still image or a moving image via an optical system such as a lens according to control by the processor 901. The imaging device 913 may store the imaged image in the memory 903 or the storage 905. Note that at least part of the configuration of the above-described detecting unit 105 may be realized with the imaging device 913.

The sound collection device 917 is a device such as a microphone for collecting speech uttered from the user and sound of a surrounding environment and acquires the speech and the sound as acoustic information (acoustic signal). Further, the sound collection device 917 may acquire an analog acoustic signal indicating the collected speech and sound as acoustic information or may convert the analog acoustic signal into a digital acoustic signal and acquire data indicating the converted digital acoustic signal as the acoustic information. Note that at least part of the configuration of the above-described detecting unit 105 may be realized with the sound collection device 917.

The communication device 915, which is communication means provided at the information processing apparatus 10, communicates with an external apparatus via a network. The communication device 915 is a communication interface for wired communication or radio communication. In the case where the communication device 915 is configured as a radio communication interface, the communication device 915 may include a communication antenna, a radio frequency (RF) circuit, a baseband processor, or the like.

The communication device 915 has a function of performing various kinds of signal processing on a signal received from an external apparatus and can supply a digital signal generated from the received analog signal to the processor 901. Note that the above-described communication unit 117 can be realized with the communication device 915.

The bus 919 connects the processor 901, the memory 903, the storage 905, the operation device 907, the notification device 909, the detection device 911 and the communication device 915 with each other. The bus 919 may include a plurality of types of buses.

Further, it is also possible to create a program for causing hardware such as a processor, a memory and a storage incorporated into a computer to exert functions equivalent to those of the components of the above-described information processing apparatus 10. Further, it is also possible to provide a computer readable storage medium in which the program is recorded.

7. CONCLUSION

As described above, the information processing apparatus 10 according to the present embodiment recognizes an external device which is a transmission source of a radio signal on the basis of a detection result of the radio signal for allowing a plurality of terminals to perform direct communication via a radio transmission path. Further, the information processing apparatus 10 acquires information indicating various kinds of circumstances when the external device is recognized and records the acquired information and a recognition result of the external device in association with time information when the external device is recognized, as low level data.

Further, the information processing apparatus 10 generates or updates a real graph indicating relationship between the information processing apparatus 10 and each of the recognized other external devices on the basis of the low level data accumulated in chronological order. In the real graph generated in this manner, information indicating a circumstance when the external device is recognized, and information relating to the external device or a user of the external device are recorded for each external device automatically recognized by the information processing apparatus 10.

The information processing apparatus 10 then executes predetermined processing on the basis of information relating to the external device (or information relating to the user of the external device) recorded in the real graph when the external device is recognized.

With such a configuration, for example, in the case where an external device of a user who has shared a place in the past is recognized, the information processing apparatus 10 notifies the user of the information processing apparatus 10 that the external device is recognized. Further, in this event, the information processing apparatus 10 may present information relating to the user of the recognized external device to the user of the information processing apparatus 10. By this means, the user of the information processing apparatus 10 can recognize other users who have shared a place in the past, particularly, other users for whom it has not been recognized that the user has shared a place in the past (users in a wider range including an unacquainted user, or the like) without troublesome procedures such as pre-procedure being performed.

Further, in the case where an external device of a user who has shared a place in the past is recognized, the information processing apparatus 10 may present information indicating a circumstance when the user of the external device has shared a place in the past to the user of the information processing apparatus 10. By this means, in the case where the user of the information processing apparatus 10 meets another user whom the user of the information processing apparatus 10 has met in the past, the user of the information processing apparatus 10 can recall a circumstance at that time (such as, for example, content of the conversation at that time).

Further, the information processing apparatus 10 may execute predetermined processing according to relationship between the user of the information processing apparatus 10 and the user of the recognized external device. With such a configuration, for example, in the case where it is recognized that the user of the information processing apparatus 10 meets another user with high intimacy, the information processing apparatus 10 may notify other users different from the another user whom the user of the information processing apparatus 10 is meeting that the user of the information processing apparatus 10 is in the middle of something. By this means, it is possible to prevent a situation where communication with the another user whom the user of the information processing apparatus 10 is meeting is inhibited by contacting from other users different from the another user while the user of the information processing apparatus 10 is meeting the another user with high intimacy without troublesome operation being performed.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a recognizing unit configured to recognize a terminal which is a transmission source of a signal on the basis of a detection result of the signal for radio communication for allowing terminals to perform direct communication with each other via a radio transmission path;

a recording unit configured to record history information including a recognition result of the terminal and information for determining whether or not the terminal detected by a predetermined detecting unit is held by a user, for each first period;

a determining unit configured to determine whether or not the terminal is held by the user on the basis of the history information recorded during a second period which is longer than the first period; and a processing unit configured to execute predetermined processing on the basis of the recognition result of the terminal and the determination result.

(2)

The information processing apparatus according to (1), in which the determining unit determines whether or not the terminal is moving for each of the first period and determines whether or not the terminal is held by the user on the basis of the determination result during the second period.

(3)

The information processing apparatus according to (2), in which the recording unit records a determination result indicating whether or not the terminal is moving for each of the first period as the history information.

(4)

The information processing apparatus according to any one of (1) to (3), in which the processing unit executes the predetermined processing on the terminal determined to be held by the user among the recognized terminals.

(5)

The information processing apparatus according to any one of (1) to (4), in which the recording unit acquires first information indicating a circumstance when the terminal is detected for each of the first period and records the first information as the history information corresponding to the terminal.

(6)

The information processing apparatus according to (5), in which the first information includes information relating to an external environment of a user of the information processing apparatus detected by a predetermined detecting unit.

(7)

The information processing apparatus according to (5) or (6), in which the first information includes information relating to other users located around a user of the information processing apparatus detected by a predetermined detecting unit.

(8)

The information processing apparatus according to any one of (5) to (7), in which the recording unit records second information relating to the terminal or a user of the terminal in association with the terminal and updates the second information on the basis of the history information corresponding to the terminal.

(9)

The information processing apparatus according to (8), in which the recording unit records the determination result indicating whether or not the terminal is held by the user as the second information.

(10)

The information processing apparatus according to (8) or (9), in which the recording unit acquires information indicating relationship between a user of the information processing apparatus and a user of the recognized terminal, as the second information.

(11)

The information processing apparatus according to any one of (8) to (10), in which the processing unit executes predetermined processing on the basis of the second information associated with the recognized terminal.

(12)

The information processing apparatus according to any one of (8) to (11), in which the recording unit updates the second information associated with the terminal on the basis of other second information associated with the terminal by an external apparatus.

(13)

The information processing apparatus according to any one of (8) to (12), in which the processing unit generates or updates display information presenting relationship between the information processing apparatus and the terminal on the basis of the second information associated with the terminal.

(14)

The information processing apparatus according to (13), in which the processing unit generates the display information by associating a first object indicating the information processing apparatus with a second object indicating the terminal using a link and associating the first information and the second information corresponding to the terminal with the second object.

(15)

The information processing apparatus according to any one of (8) to (14), in which, in the case where the terminal for which the history information has been recorded in the past is recognized, the processing unit causes a notifying unit to give a notification of predetermined notification information.

(16)

The information processing apparatus according to (15), in which the processing unit causes the notifying unit to give a notification of the predetermined notification information in accordance with the second information associated with the recognized terminal.

(17)

The information processing apparatus according to any one of (5) to (16), in which the recording unit associates third information relating to a plurality of terminals in common, with the plurality of terminals or information indicating relationship among the plurality of terminals on the basis of the first information respectively corresponding to the plurality of terminals different from each other.

(18)

An information processing method to be performed by a processor, the information processing method including:

recognizing a terminal which is a transmission source of a signal on the basis of a detection result of the signal for radio communication for allowing terminals to perform direct communication with each other via a radio transmission path;

recording history information including a recognition result of the terminal and information for determining whether or not the terminal detected by a predetermined detecting unit is held by a user, for each first period;

determining whether or not the terminal is held by the user on the basis of the history information recorded during a second period which is longer than the first period; and executing predetermined processing on the basis of the recognition result of the terminal and the determination result.

(19)

A program causing a computer to execute:

recognizing a terminal which is a transmission source of a signal on the basis of a detection result of the signal for radio communication for allowing terminals to perform direct communication with each other via a radio transmission path;

recording history information including a recognition result of the terminal and information for determining whether or not the terminal detected by a predetermined detecting unit is held by a user, for each first period;

determining whether or not the terminal is held by the user on the basis of the history information recorded during a second period which is longer than the first period; and executing predetermined processing on the basis of the recognition result of the terminal and the determination result.

REFERENCE SIGNS LIST

10 information processing apparatus
101 radio signal detecting unit
103 device recognizing unit
105 detecting unit
107 data recording unit
109 analyzing unit
111 processing executing unit
113 notifying unit
115 input unit
117 communication unit
31 storage unit
50 server

The invention claimed is:

1. An information processing apparatus, comprising:
a recognizing unit configured to recognize a first terminal based on a detection of a radio signal which is transmitted from the first terminal,
wherein the radio signal enables the first terminal to directly communicate with a second terminal, via a radio transmission path;
a determining unit configured to determine first information, related to the recognized first terminal, for a first period;
a recording unit configured to record the first information as history information corresponding to the first terminal,
wherein the determining unit is further configured to determine second information, related to the recognized first terminal, for a second period which is after the first period, wherein the recording unit is further configured to update the history information based on the second information, wherein each of the first information and the second information indicates a location of the first terminal based on the first terminal that is recognized, wherein the determining unit is further configured to determine a type of a relation between the information processing apparatus and the recognized first terminal, and wherein the type of the relation is determined based on a number of times of the recognition of the first terminal, at the location, that is greater than a threshold number of times; and a processing unit configured to execute a process based on the recognized first terminal, a result of the determination unit, and the updated history information.

2. The information processing apparatus according to claim 1, wherein the determining unit is further configured to:

determine a movement of the first terminal for each of the first period and the second period; and determine, the first terminal is held by a user, based on the determination of the movement of the first terminal for the second period.

3. The information processing apparatus according to claim 2, wherein the recording unit is further configured to record, the determination of the movement of the first terminal for each of the first period and the second period, as the history information.

4. The information processing apparatus according to claim 1, wherein the recognizing unit is further configured to recognize a plurality of terminals based on a detection of a plurality of radio signals, and wherein the processing unit is further configured to execute the process, on at least one terminal of the plurality of terminals, based on the at least one terminal that is held by a user.

5. The information processing apparatus according to claim 1, wherein the first information further indicates a first circumstance when the first terminal is detected for the first period, wherein the second information further indicates a second circumstance based on the first terminal that is detected for the second period, and wherein the recording unit is further configured to record the first information and the second information as the history information corresponding to the first terminal.

6. The information processing apparatus according to claim 5, further comprising a detecting unit configured to acquire third information related to an external environment of a user of the information processing apparatus.

7. The information processing apparatus according to claim 5, wherein the determining unit is further configured to acquire third information related to a plurality of users that are located around a user of the information processing apparatus.

8. The information processing apparatus according to claim 5, wherein the recording unit is further configured to:

record at least one of the second information related to the first terminal or third information related to a user of the first terminal in association with the first terminal, and update the history information, corresponding to the first terminal, based on the second information and the third information.

9. The information processing apparatus according to claim 8, wherein the determining unit is further configured to determine the first terminal is held by a user, and wherein the recording unit is further configured to record, the determination that the first terminal is held by the user, as fourth information.

10. The information processing apparatus according to claim 1, wherein the determining unit is further configured to:

determine the first terminal is held by a user for the first period, and determine, the first terminal is held by the user for the second period, based on the history information, wherein the determination, of the first terminal that is held by the user, is recorded in the history information.

11. The information processing apparatus according to claim 8, wherein the processing unit is further configured to execute process based on the first information, the second information, and the third information.

12. The information processing apparatus according to claim 8, wherein the recording unit is further configured to acquire, fourth information related to the first terminal, from an external apparatus; and update the history information based on the acquired fourth information.

13. The information processing apparatus according to claim 8, wherein the processing unit is further configured to at least one of generate or update display information related to the relation between the information processing apparatus and the first terminal, based on the second information.

14. The information processing apparatus according to claim 13, wherein the processing unit is further configured to generate the display information based on a first object and a second object, wherein the first object indicates the information processing apparatus and the second object indicates the first terminal, wherein the first object is associated with the second object via a link, and wherein the processing unit is further configured to associate each of the first information and the second information with the second object.

15. The information processing apparatus according to claim 8, wherein the processing unit is further configured to notify notification information based on a recognition of the history information.

16. The information processing apparatus according to claim 15, wherein the processing unit is further configured to notify the notification information based on the second information.

17. The information processing apparatus according to claim 5, wherein the recognizing unit is further configured to recognize a plurality of terminals based on a detection of a plurality of radio signals, and wherein the recording unit is further configured to:
- acquire multiple information related to the plurality of terminals such that each information of the multiple information is related to a corresponding terminal of the plurality of terminals;
- acquire third information related to the plurality of terminals in common;
- acquire fourth information that indicates relationship among the plurality of terminals; and
- associate the third information with the fourth information based on the multiple information.

18. An information processing method, comprising:
in an information processing apparatus:
recognizing a first terminal based on a detection of a radio signal which is transmitted from the first terminal,
- wherein the radio signal enables the first terminal to directly communicate with a second terminal, via a radio transmission path;
determining first information, related to the recognized first terminal, for a first period;
recording the first information as history information corresponding to the first terminal;
determining second information, related to the recognized first terminal, for a second period which is after the first period;
updating the history information based on the second information,
- wherein each of the first information and the second information indicates a location of the first terminal based on the first terminal that is recognized;
determining a type of a relation between the information processing apparatus and the recognized first terminal,
- wherein the type of the relation is determined based on a number of times of the recognition of the first terminal, at the location, that is greater than a threshold number of times; and
executing process based on the recognized first terminal, the determined type of the relation, and the updated history information.

19. A non-transitory computer-readable medium having stored thereon, computer-executable instructions, which when executed by an information processing apparatus, cause the information processing apparatus to execute operations, the operations comprising:
recognizing a first terminal based on a detection of a radio signal which is transmitted from the first terminal,
- wherein the radio signal enables the first terminal to directly communicate with a second terminal, via a radio transmission path, based on;
determining first information, related to the recognized first terminal, for a first period;
recording the first information as history information corresponding to the first terminal;
determining second information, related to the recognized first terminal, for a second period which is after the first period;
updating the history information based on the second information,
- wherein each of the first information and the second information indicates a location of the first terminal when the first terminal is recognized;
determining a type of a relation between the information processing apparatus and the recognized first terminal,
- wherein the type of the relation is determined based on a number of times of the recognition of the first terminal, at the location, that is greater than a threshold number of times; and
executing process based on the recognized first terminal, the determined type of the relation, and the updated history information.

* * * * *